US012719156B2

(12) United States Patent
Oh et al.

(10) Patent No.: US 12,719,156 B2
(45) Date of Patent: Aug. 25, 2026

(54) WEARABLE DEVICE COMPRISING ANTENNA USING MICROPHONE GRILL

(71) Applicant: Samsung Electronics Co., Ltd., Suwon-si (KR)

(72) Inventors: Juntaek Oh, Suwon-si (KR); Daegi Yi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 104 days.

(21) Appl. No.: 18/804,685

(22) Filed: Aug. 14, 2024

(65) Prior Publication Data

US 2024/0405409 A1 Dec. 5, 2024

Related U.S. Application Data

(63) Continuation of application No. PCT/KR2023/002040, filed on Feb. 10, 2023.

(30) Foreign Application Priority Data

Apr. 11, 2022 (KR) ........................ 10-2022-0044348
May 19, 2022 (KR) ........................ 10-2022-0061679

(51) Int. Cl.
*H04R 1/10* (2026.01)
*H01Q 1/27* (2006.01)
(Continued)

(52) U.S. Cl.
CPC ........... *H01Q 1/273* (2013.01); *H01Q 9/0407* (2013.01); *H01Q 9/40* (2013.01); *H04R 1/086* (2013.01);
(Continued)

(58) Field of Classification Search
CPC .... H04R 1/086; H04R 1/1016; H04R 1/1041; H04R 1/1075; H04R 1/406; H04R 2420/07; H04R 3/005
See application file for complete search history.

(56) References Cited

U.S. PATENT DOCUMENTS 6,741,719 B1 5/2004 Orten
9,477,440 B2 10/2016 Calatayud
(Continued)

FOREIGN PATENT DOCUMENTS

CN 212211345 U 12/2020
EP 4425703 A1 * 9/2024 ............. H01Q 1/245
(Continued)

OTHER PUBLICATIONS

Korean Office Action issued Jan. 21, 2026 in corresponding Korean Patent Application No. 10-2022-0061679.
(Continued)

*Primary Examiner* — David L Ton
(74) *Attorney, Agent, or Firm* — Nixon & Vanderhye, P.C.

(57) ABSTRACT

A wearable device according to an embodiment may comprise: a housing including a first surface facing a first direction in which a first audio signal is configured to be transmitted to the outside of the wearable device, and a second surface including a first opening that connects an inner space to the outside and faces a second direction different from the first direction; a first microphone in the housing, configured to obtain a second audio signal distinguished from the first audio signal and introduced through the first opening; a first grill surrounding the first opening and including a conductive portion; and a conductive pattern connected to the conductive portion and arranged in a portion of the inner surface of the housing.

20 Claims, 20 Drawing Sheets

(51) Int. Cl.

| | |
|---|---|
| ***H01Q 9/04*** | (2006.01) |
| ***H01Q 9/40*** | (2006.01) |
| ***H04R 1/08*** | (2006.01) |
| ***H04R 1/40*** | (2006.01) |
| ***H04R 3/00*** | (2006.01) |

(52) U.S. Cl.

CPC ......... *H04R 1/1016* (2013.01); *H04R 1/1041* (2013.01); *H04R 1/1075* (2013.01); *H04R 1/406* (2013.01); *H04R 3/005* (2013.01); *H04R 2420/07* (2013.01)

(56) References Cited

U.S. PATENT DOCUMENTS

| | | | | |
|---|---|---|---|---|
| 9,615,154 | B2 | 4/2017 | Heo | |
| 9,832,292 | B2 | 11/2017 | Moon | |
| 10,186,755 | B2 | 1/2019 | Xiong | |
| 10,766,440 | B2 | 9/2020 | Sung | |
| 10,993,011 | B2 | 4/2021 | Hankey | |
| 11,374,312 | B2 | 6/2022 | Chen | |
| 2022/0103930 | A1 | 3/2022 | Zhang | |
| 2023/0156395 | A1 | 5/2023 | Oh et al. | |
| 2023/0164473 | A1 | 5/2023 | Jang | |
| 2023/0179912 | A1 | 6/2023 | Chang et al. | |
| 2023/0387573 | A1* | 11/2023 | Han | H01Q 1/273 |

FOREIGN PATENT DOCUMENTS

| | | | |
|---|---|---|---|
| KR | 200161537 | Y1 | 12/1999 |
| KR | 10-2001-0074758 | | 8/2001 |
| KR | 101471466 | B1 | 12/2014 |
| KR | 101786756 | B1 | 10/2017 |
| KR | 20210010597 | A | 1/2021 |
| KR | 10-2022-0012587 | A | 2/2022 |
| KR | 10-2022-0017158 | A | 2/2022 |
| KR | 102361149 | B1 | 2/2022 |
| KR | 20220012587 | A | 2/2022 |
| KR | 20220015833 | A | 2/2022 |
| KR | 20220017158 | A | 2/2022 |
| WO | 2019/032196 | A1 | 2/2019 |

OTHER PUBLICATIONS

Extended European Search Report dated Mar. 27, 2025 issued in European Patent Application No. 23788451.5.

International Search Report for PCT/KR2023/002040 mailed May 22, 2023, 5 pages.

Written Opinion of the ISA for PCT/KR2023/002040 mailed May 22, 2023, 4 pages.

* cited by examiner

WEARABLE DEVICE COMPRISING ANTENNA USING MICROPHONE GRILL

CROSS-REFERENCE TO RELATED APPLICATIONS

This application is a continuation of International Application No. PCT/KR2023/002040 designating the United States, filed on Feb. 10, 2023, in the Korean Intellectual Property Receiving Office and claiming priority to Korean Patent Application Nos. 10-2022-0044348, filed on Apr. 11, 2022, and 10-2022-0061679, filed on May 19, 2022, in the Korean Intellectual Property Office, the disclosures of each of which are incorporated by reference herein in their entireties.

BACKGROUND

Field

The disclosure relates to a wearable device including an antenna using a grill for a microphone.

Description of Related Art

A wearable device may be worn on a part of a user's body. The wearable device may include an antenna module in order to communicate with an external electronic device. The wearable device may be configured to transmit visual or auditory information to a user, based on information received from the external electronic device communicating with the wearable device.

A wearable device may be configured to be worn on a user's body. In order to be used in a form in which the wearable device is worn, it may be required to reduce a weight of the wearable device. In order to reduce the weight and miniaturization of the wearable device, an inner space may be narrow. A plan to secure an electrical length to secure antenna performance within the narrow inner space is required.

SUMMARY

Embodiments of the disclosure provide a wearable device including a structure that secures a sufficient electrical length using a microphone grill as a portion of an antenna.

According to an example embodiment, a wearable device may comprise: a housing including a first surface facing a first direction in which a first audio signal is transmitted to the outside of the wearable device, a second surface including a first opening facing a second direction different from the first direction and connecting the outside and an inner space of the wearable device, a first microphone, in the housing, configured to obtain a second audio signal distinct from the first audio signal and conducted through the first opening, a first grill surrounding the first opening and including a conductive portion, and a conductive pattern connected to the conductive portion and disposed on a portion of an inner surface of the housing. According to an example embodiment, the wearable device my further comprise at least one processor, comprising processing circuitry, electrically connected to the conductive pattern. According to an example embodiment, at least one processor, individually and/or collectively, may be configured to communicate with an external electronic device through the conductive pattern and the conductive portion.

According to an example embodiment, a wearable device may comprise: a housing including a first surface, facing in a first direction, including a first opening facing a first direction in which a first audio signal is transmitted to outside of the wearable device, a second surface including a second opening facing a second direction different from the first direction and connecting the outside and an inner space of the wearable device, the housing including a through hole connecting the first opening and the second opening, a first grill including a mesh pattern disposed at the second opening and a support formed along a perimeter of the mesh pattern, the support having a shape corresponding the second opening, and a conductive pattern connected to the first grill and disposed on a portion of an inner surface of the housing. According to an example embodiment, a wearable device may comprise at least one processor, comprising processing circuitry, electrically connected to the conductive pattern. According to an example embodiment, at least one processor, individually and/or collectively, is configured to communicate with an external electronic device through the conductive pattern and a portion of the first grill.

According to an example embodiment, a wearable device can secure an electrical length of an antenna by connecting a microphone grill including a conductive portion and an existing antenna pattern and using it as an antenna element.

The effects that can be obtained from the present disclosure are not limited to those described above, and any other effects not mentioned herein will be clearly understood by those having ordinary knowledge in the art to which the present disclosure belongs, from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
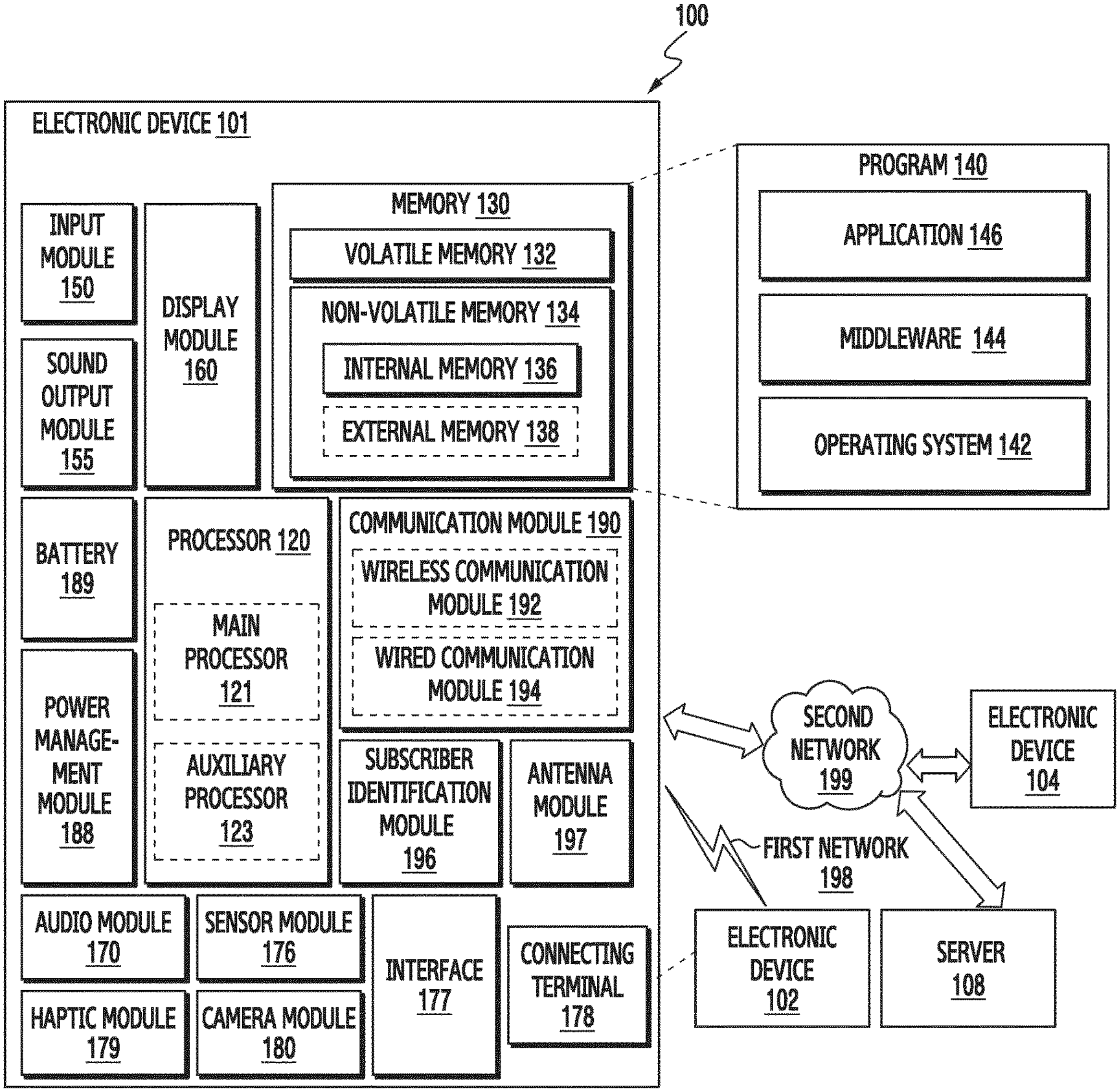
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module).

A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mm Wave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
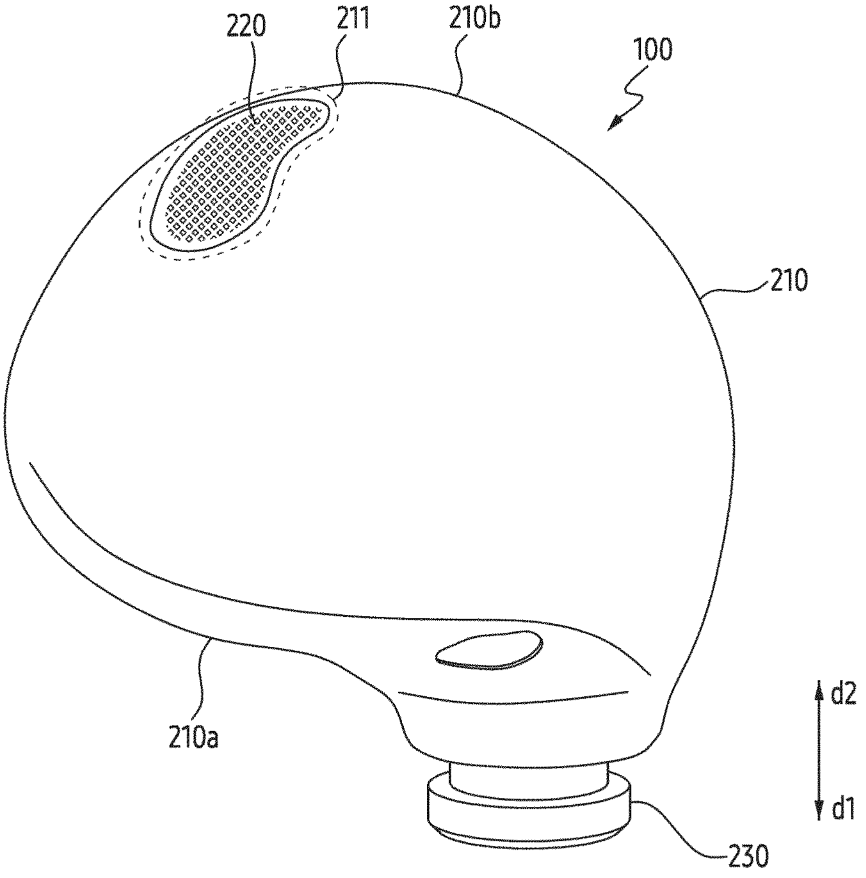
FIG. 2A is a perspective view of an example wearable device according to various embodiments.
Figure 2B:
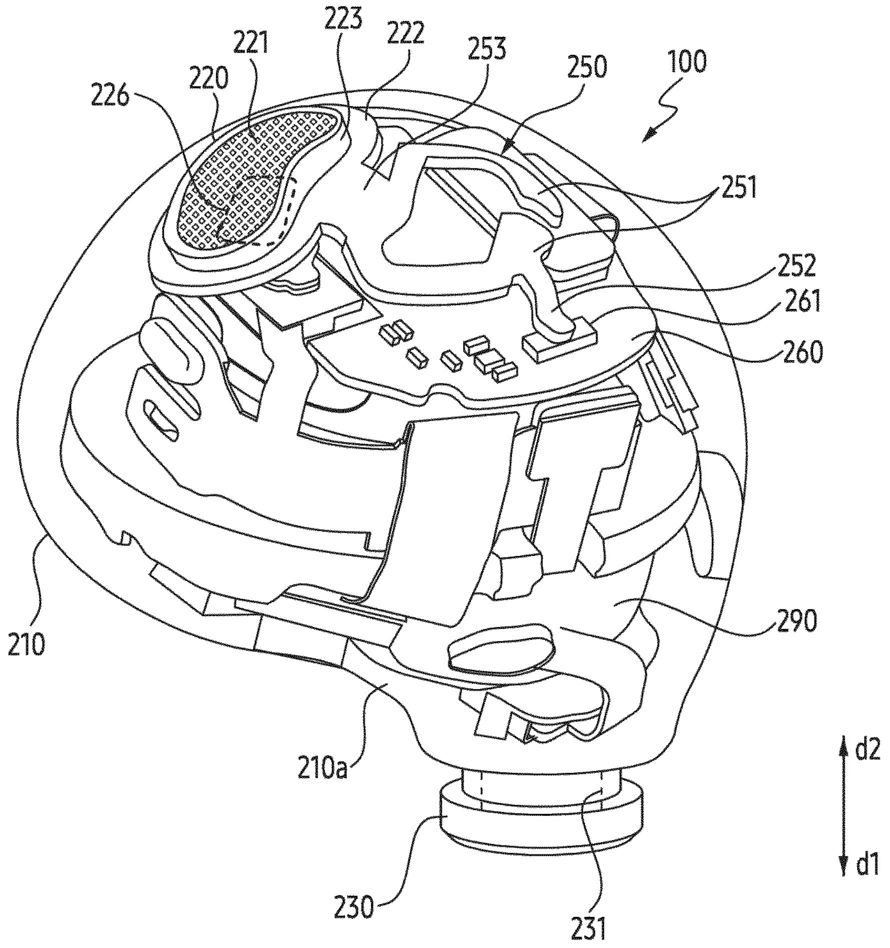
FIG. 2B is a perspective view of an example wearable device removing a portion of a housing of a wearable device according to various embodiments.
Figure 2C:
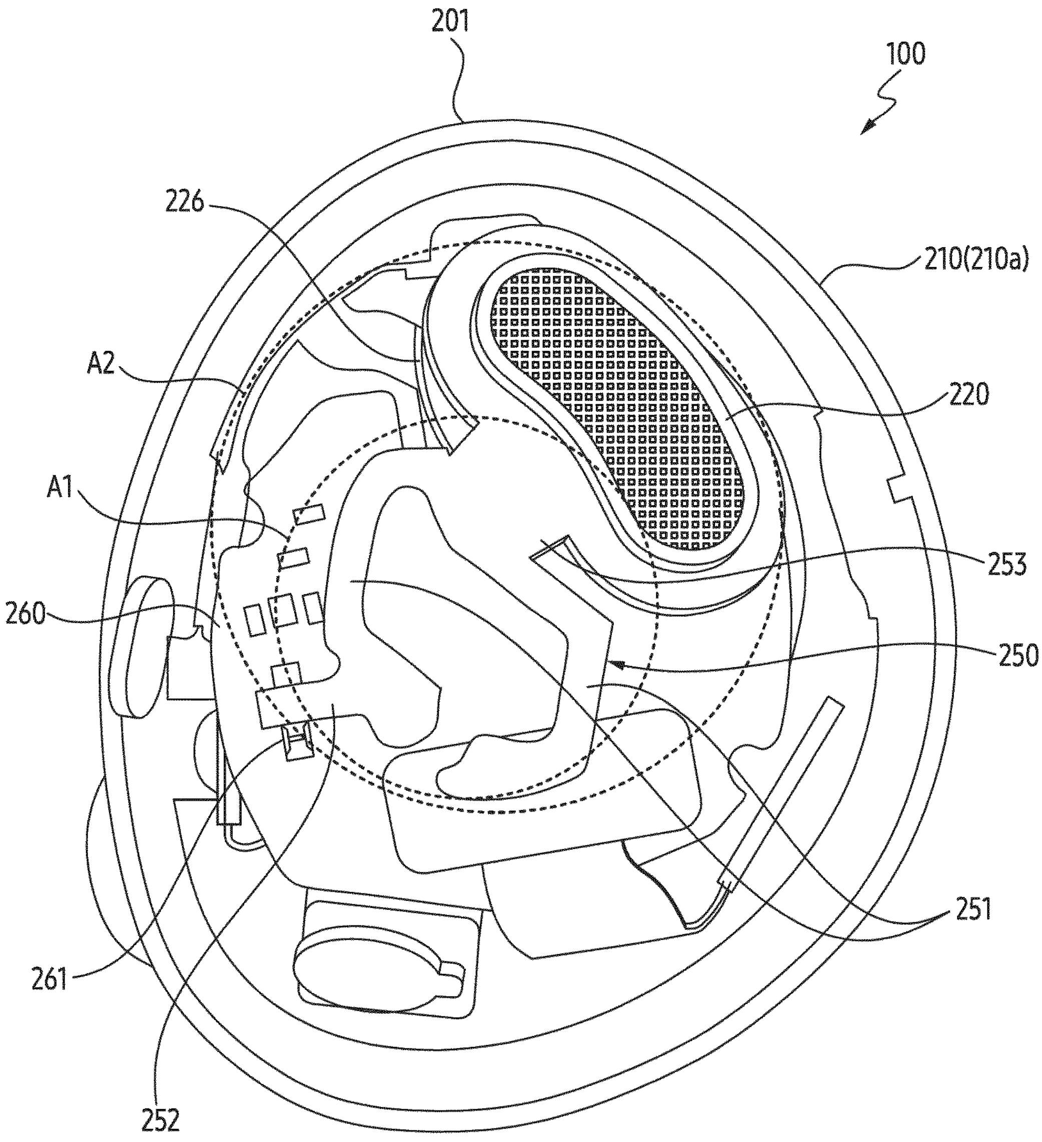
FIG. 2C is a diagram illustrating a top plan view of an example wearable device removing a portion of a housing of a wearable device according to various embodiments.

FIG. 2A is a perspective view of an example wearable device according to various embodiments. FIG. 2B is a perspective view of an example wearable device removing a portion of a housing of a wearable device according to various embodiments. FIG. 2C is a diagram illustrating a top plan view of an example wearable device removing a portion of a housing of a wearable device according to various embodiments.

An electronic device (e.g., the electronic device 100 of FIG. 1) may be referred to as a wearable device. The wearable device 100 may be an earbud worn on a part (e.g., an car) of a user's body, and transmitting an audio signal to the user. The wearable device 100 may transmit an audio signal to the user through a speaker 290. The wearable device 100 may correct the audio signal, in order to prevent/reduce ambient noise of the wearable device from being transmitted to the user.

Referring to FIGS. 2A, 2B, and 2C, the wearable device 100 may include a housing 210, a microphone 226, a grill 220, a conductive pattern 250, and a printed circuit board 260.

According to an embodiment, the housing 210 may form an exterior of the wearable device 100. The housing 210 may be an outer surface of the wearable device 100, but is not limited thereto. According to an embodiment, the housing 210 may be a member forming a shape of the exterior. The wearable device 100 may further include an external cover disposed on the outer surface of the housing 210. The housing 210 may separate the outside and the inside of the wearable device 100. The housing 210 may surround an inner space of the wearable device 100. The inner space may be a space in which components of the wearable device 100 are disposed. The components may include the speaker 290, the microphone 226, the printed circuit board 260, and the conductive pattern 250 functioning as an antenna, which are required to drive the wearable device 100. According to an embodiment, the housing 210 may be formed of a plurality of parts, and assembled.

According to an embodiment, the housing 210 may be connected to a nozzle 230 which transmits a first audio signal to the outside of the wearable device 100. The nozzle 230 may be integrally formed with the housing 210, or may be assembled and coupled to the housing 210. The nozzle 230 may include an acoustic pipe which transmits the first audio signal emitted from the speaker 290 in the housing 210 to the user's car. The acoustic pipe may be an audio path through which the first audio signal moves, as a hole passing through the nozzle 230.

According to an embodiment, the housing 210 may include a first surface 210*a* facing a first direction d1 in which a transmission path of the first audio signal is extended and a second surface 210*b* including an opening 211 facing a second direction d2 different from the first direction d1. The first surface 210*a* and the second surface 210*b* may include a curved surface. The first surface 210*a* may be a curved surface convexly formed in the first direction d1. The second surface 210*b* may be a curved surface convexly formed in the second direction d2. The first surface 210*a* may face the second surface 210*b*, and an edge of the first surface 210*a* may contact an edge of the second surface 210*b*.

According to an embodiment, the first surface 210*a* may be a surface in which the nozzle 230 extended in the first direction d1 protrudes. The second surface 210*b* may include the opening 211 facing the second direction d2. A portion of the grill 220 (e.g., a mesh pattern 221 and/or a frame 223) may be inserted into the opening 211. A second audio signal may be conducted into the inside of the wearable device 100 through the opening 211. The second audio signal may be an audio signal transmitted to the microphone 226.

According to an embodiment, the microphone 226 in the housing 210 may face the opening 211. The microphone 226 may obtain the second audio signal through the opening 211. The second audio signal may be distinct from the first audio signal. The second audio signal may be an acoustic signal conducted from the outside. The second audio signal may include noise generated around the wearable device 100. The second audio signal may be used to correct the first audio signal.

According to an embodiment, the opening 211 may be formed to face the second direction d2. The second direction d2 may be a direction different from the first direction d1, which includes a direction opposite to the first direction d1. The opening 211 may transmit the second audio signal conducted through the second direction d2, to the microphone 226. At least a portion of the microphone 226 may overlap the opening 226 when the opening 226 is viewed in the first direction d1. An acoustic path for transmitting the second audio signal may be included between the opening 211 and the microphone 226. The acoustic path may extend from the opening 211 to the microphone 226. The acoustic path may be formed by a structure disposed inside the housing 210. According to an embodiment, the wearable device 100 may include a plurality of microphones. The microphones may be microphones obtaining a user's voice, or may be microphones obtaining the second audio signal, which is external noise.

According to an embodiment, the grill 220 may surround the opening 211. The grill 220 may have a shape corresponding to the opening 211. The grill 220 may be disposed to across the inner space of the wearable device 100 connected to the opening 211 and the outside. The grill 220 may include a conductive portion. For example, the entire grill 220 may be formed of a conductive portion, and a portion of the grill 220 may be formed of the conductive portion. The conductive portion may be formed of a metal, which is capable of conducting current and has rigidity. The conductive portion may include stainless steel. The grill 220 may prevent/reduce air flowing around the wearable device 100 from flowing into the microphone 226 through the opening 211. For example, the grill 220 may disperse the air flow or scatter the air, while the air passes through the opening 211. A transmission of the scattered air to the microphone 226 may be prevented/reduced. The grill 220 may prevent or block a foreign substance from flowing into the inside through the opening 211.

According to an embodiment, the grill 220 may include a mesh pattern 221, a supporter (e.g., a support) 222, and/or a frame 223. The mesh pattern 221 may have a shape corresponding to a cross-section of the opening 211. For example, the mesh pattern 221 may be formed to sufficiently surround the entire opening 211. According to an embodiment, the grill 220 may further include the frame 223 disposed between the opening 211 and the mesh pattern 221. The frame 223 may be in contact with inside of the opening 211 along an edge of the opening 211. The frame 223 may extend along an edge of the mash pattern 221, and define an appearance of the mesh pattern 221. The supporter 222 may support the mash pattern 221 and the frame 223. The supporter 222 may be attached to an inner surface of the housing 210. The mash pattern 221 fixed or supported by the supporter 222 may cover the cross-section of the opening 211. The supporter 222 may be disposed along the edge of the opening 211 formed in the housing 210. The supporter 222 may be attached to the edge of the opening 211 of the housing 210. A partial area of the housing 210 to which the supporter 222 is attached may form a continuous surface with the inner surface, but is not limited thereto. For example, a partial area of the housing 210 may form a recess or a groove. The supporter 222 may be seated in the recess or the groove.

According to an embodiment, the mesh pattern 221 may be formed as a curved surface corresponding to the second surface 210*b*. The mesh pattern 221 may be disposed in the opening 211. The mesh pattern 221 may protrude from the supporter 222 in the second direction d2. The frame 223 may be positioned between the mesh pattern 221 and the supporter 222. The frame 223 may extend in the second direction d2 along a side surface of the opening 211. A distance between the mesh pattern 221 and the printed circuit board 260 may be different from a distance between the supporter 222 and the printed circuit board 260. The frame 223 may connect the mesh pattern 221 and the supporter 222. The frame 223 may be inserted into the opening 211, and the supporter 222 may be attached to the inner surface of the housing 210. The frame 223 and the supporter 222 may be coupled to the housing 210, so that the grill 220 may be attached to the housing 210.

According to an embodiment, a current may flow through an entire area of the grill 220. The grill 220 may include the mash pattern 221, the supporter 222, and/or the frame 223, which are formed of a conductive material. The grill 220 formed of the conductive material may be connected to the conductive pattern 250 to function as an antenna element. For example, the grill 220 and the conductive pattern 250 may be fed through a feeder to transmit an electromagnetic wave to the outside of the wearable device 100. According to an embodiment, the conductive pattern 250 may be disposed on a portion of the inner surface of the housing 210. For example, the conductive pattern 250 may have a shape corresponding to the inner surface of the housing 210. The conductive pattern 250 may be attached to the inner surface of the housing 210. However, the disclosure is not limited thereto, and the conductive pattern 250 may be printed on a carrier formed of a non-conductive portion. The conductive pattern 250 may be disposed to face an inner surface of the housing 210. For another example, the carrier and the conductive pattern 250 may be referred to as a laser direct structuring antenna (LDS antenna). The carrier may be a resin (e.g., polycarbonate). The conductive pattern 250 may be printed in a groove formed on the resin through laser processing.

According to an embodiment, a partial area of the grill 220 may include a conductive portion through which the current may flow, and a remaining area of the grill 220 may include a non-conductive portion. For example, the non-conductive portion may be the mesh pattern 221, and the conductive portion may be the supporter 222. The supporter 222 may be electrically connected to the conductive pattern 250 and function as an antenna element.

According to an embodiment, a radiation extent of the antenna may increase by being coupled with a conductive portion (e.g., at least a portion of the grill 220) disposed around the conductive pattern 250. An antenna performance may be improved by the increased extent of the antenna radiator. For example, an electrical length of the antenna required in a low frequency band may be secured by connection of the conductive pattern 250 and the conductive portion around the conductive pattern 250. A gain of the antenna may increase by the increased extent of the antenna radiator. When only the conductive pattern 250 functions as an antenna, a radiation extent of the antenna element may be an area A1. When both the conductive pattern 250 and the grill 220 function as an antenna, a radiation extent of the antenna element may be an area A2. When the conductive pattern 250 functions as an antenna, the conductive portion disposed around the conductive pattern 250 may be coupled or cause parasitic capacitance, by electromagnetic interaction with the conductive pattern 250. The conductive portion may distort a signal radiated from the conductive pattern 250. According to an embodiment, the conductive pattern 250 may be electrically connected to the mesh pattern 221, the supporter 222, or the frame 223, which are the conductive portion, so that the distortion of the signal radiated from the antenna element and/or the grill may be reduced or an output of the radiated signal may be improved. For example, the conductive portion (e.g., the conductive portion of the grill 220) that causes the parasitic capacitance may be used as a conductive pattern to reduce the distortion of the signal. Based on the electrical connection between the mesh pattern 221, the supporter 222, or the frame 223, which are the conductive portions, the conductive pattern 250 may provide an electrical length for securing the performance of the antenna.

According to an embodiment, the conductive pattern 250 is electrically connected to at least one portion of the frame 223 including the supporter 222 or the conductive portion, so that the output of the signal radiated from the antenna element and/or the grill may be improved.

According to an embodiment, the conductive pattern 250 may be connected to the conductive portion of the grill 220. The conductive pattern 250 may include a body portion 251, an extension portion 252, and a bridge 253. The body portion 251 may determine a shape of the conductive pattern 250. An antenna structure of the conductive pattern 250 may be determined according to a shape of the body portion 251 or a connection shape with the grill 220. For example, based on the shape of the body portion 251 or the connection shape with the grill 220, the conductive pattern 250 may function as a patch antenna, a monopole antenna, a F antenna, an inverted F antenna, or a dipole antenna. However, the disclosure is not limited thereto.

According to an embodiment, the conductive pattern 250 may be disposed in the inner surface of the housing 210. The conductive pattern 250 may be disposed in an inner surface facing the second surface of the housing 210 in which the opening 211 is formed. The conductive pattern 250 may function as an antenna by being fed from the feeder. The conductive pattern 250 may receive power from a wireless communication circuit, and emit the electromagnetic wave to the outside of the wearable device 100. The conductive pattern 250 may be disposed on the inner surface of the housing 210. According to an embodiment, at least a portion of the conductive pattern 250 may be disposed in the outside the housing 210. For example, a portion of the bridge 253 of the conductive pattern 250 may be exposed through a space between the opening 211 and the mesh pattern 221. With the conductive pattern 250 fixed to the inner surface of the housing 210, the wearable device 100 may fix the antenna without the carrier formed of a non-conductive material fixing an antenna pattern. Since the carrier is not included, the wearable device 100 may efficiently utilize the inner space. Degree of freedom for arranging components disposed in the housing 210 of the wearable device 100 may increase. Degree of freedom of exterior design of the wearable device 100 may also increase, by the efficiency of the inner space.

According to an embodiment, the printed circuit board 260 on which the wireless communication circuit or at least one processor (e.g., the processor 120 of FIG. 1) is disposed may be electrically connected to the conductive pattern 250 or the grill 220. For example, the printed circuit board 260 may include a connection member 261 connected to the conductive pattern 250. The printed circuit board 260 may be disposed on a lower portion 201 of the housing 210 forming the first surface 210*a* of the housing 210. The lower portion 201 may be a portion of the housing 210 facing the first direction d1. However, the disclosure is not limited thereto. The connection member (e.g., connector) 261 may be a contact or a C-clip. The connection member 261 may be in contact with the extension portion 252 of the conductive pattern 250. For example, the extension portion 252 of the conductive pattern 250 disposed on the inner surface of the housing 210 may maintain the contact with the connection member 261 by assembly of the wearable device 100.

According to an embodiment, at least one processor 120 may be operably connected to the conductive pattern 250 and the grill 220. At least one processor 120 may detect access of an external object using the conductive pattern 250 and the grill 220. For example, the processor 120 may obtain impedance change value of the conductive pattern 250 and the grill 220 from the conductive pattern 250 and the grill 220. The impedance of the conductive pattern 250 and the grill 220 may change according to the access of the external object. For example, when a user's hand accesses the area A2 on which the conductive pattern 250 and/or the grill 220 is disposed, the capacitance or impedance of the conductive pattern 250 and/or the grill 220 may change. The processor 120 may identify whether the external object accesses or contacts to the area A2 of the external object, based on the changed capacitance or impedance value of the conductive pattern 250 and/or the grill 220.

According to an embodiment, as the conductive pattern 250 is connected to the grill 220, a touch recognition area may extend to the area A2. The area A2, which is a touch recognition area secured by the connection between the conductive pattern 250 and the grill 220, may be wider than the area A1, which is a touch recognition area when only the conductive pattern 250 is electrically connected to the processor 120.

According to an embodiment, the wearable device 100 may secure the length of the antenna for forming a resonance frequency, by coupling the conductive pattern 250 and the conductive portion of the grill 220. The shape of the antenna pattern may be freely designed by the increase of a space in which the antenna pattern may be formed. The wearable device 100 may reduce antenna signal interference and reducing the radiation due to peripheral conductive portion, using an antenna element in which the conductive pattern 250 and the grill 220 are integrally formed. The wearable device 100 may expand the touch recognition area by coupling the conductive pattern 250 and the grill 220 and using it as a touch sensor that detects an external object.

Figure 3:
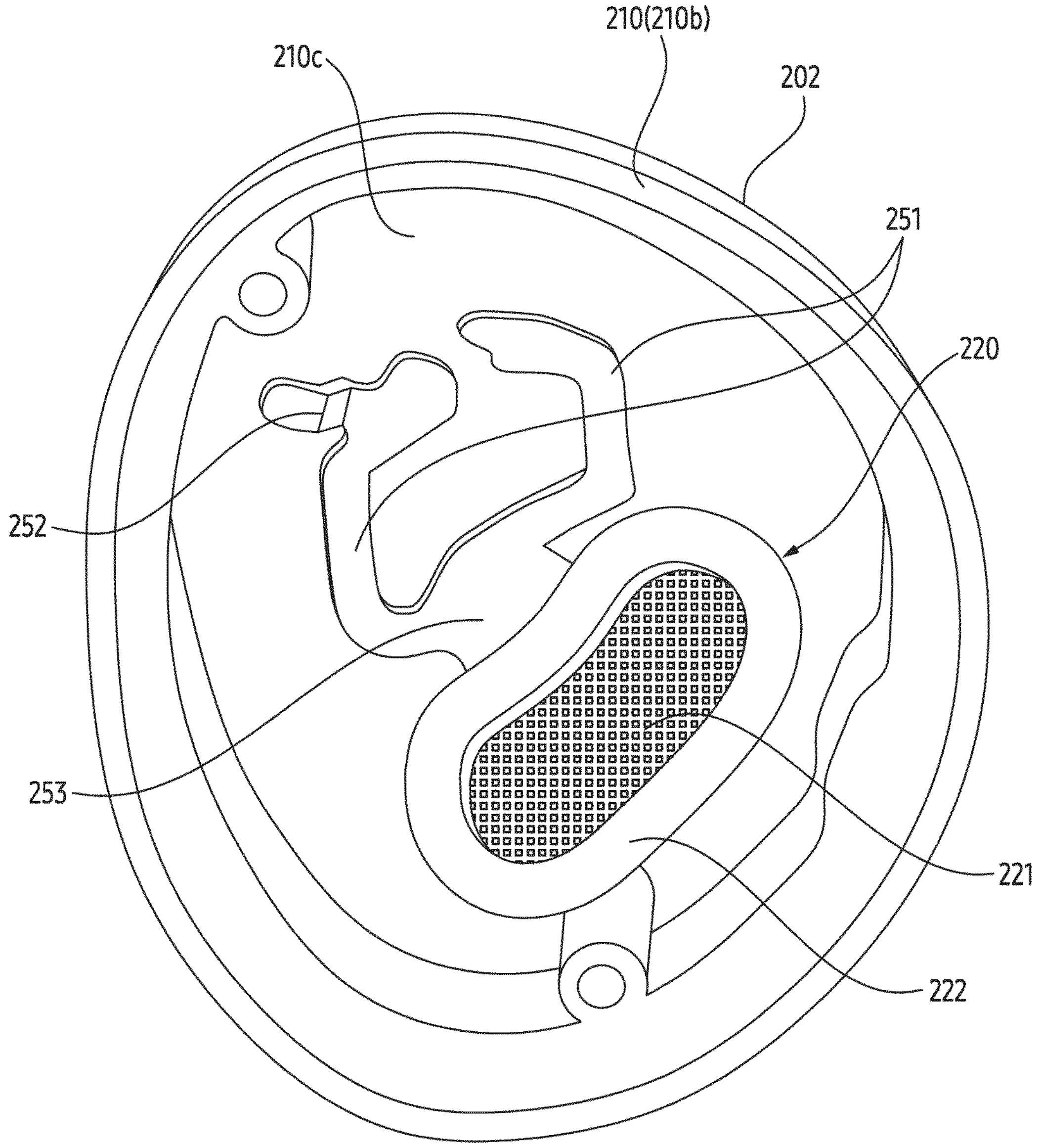
FIG. 3 is a diagram illustrating a bottom view of an example wearable device in which an inner surface of a portion of a housing of a wearable device is viewed according to various embodiments.

FIG. 3 is a diagram illustrating a bottom view of an example wearable device in which an inner surface of a portion of a housing of the wearable device is viewed according to various embodiments.

Referring to FIG. 3, an upper portion 202 of a housing 210 may include a second surface 210*b* of the housing 210. The upper portion 202 of the housing 210 may include an inner surface 210*c* facing the second surface 210*b* of the housing 210. The inner surface 210*c* may be a surface surrounding an inner space of a wearable device (e.g., the electronic device 100 of FIG. 1 or the wearable device 100 of FIG. 2A). For example, the inner surface 210*c* may surround the inner space of the wearable device 100 together with an inner surface of a lower portion (e.g., the lower portion 201 of FIG. 2) of the housing 210.

According to an embodiment, a conductive pattern 250 and a grill 220 may be disposed in the inner surface 210*c* of the housing 210. The conductive pattern 250 may have a shape corresponding to a shape of the inner surface 210*c* of the housing 210. The inner surface 210*c* of the housing 210 may be formed as a curved surface corresponding to the second surface 210*b*. The conductive pattern 250 attached to the inner surface 210*c* may extend along the inner surface 210*c* to correspond to the curved surface of the inner surface 210*c*. The grill 220 may be partially inserted into an opening (e.g., the opening 211 of FIG. 2A) penetrating the second surface 210*b* and the inner surface 210*c* to be disposed inside of the housing 210.

According to an embodiment, the grill 220 may include a mesh pattern 221, which passes through the opening 211 or is disposed in an empty space formed by the opening 211, and a supporter 222, which fixes the mesh pattern 221 to the housing 210. An area including the mesh pattern 221 of the grill 220 may occupy the empty space formed by the opening 211. The mesh pattern 221 may be exposed to the outside of the wearable device 100 through the opening 211. The supporter 222 may be formed along a perimeter of the mesh pattern 221 surrounding the opening 211. The supporter 222 may be disposed in the inner surface 210*c*. For example, the supporter 222 may have a width, and may be formed along a perimeter of the opening 211. The supporter 222 may fix the grill 220 to the housing 210 by being disposed in the inner surface 210*c* along the perimeter of the opening 211. An area of the mesh pattern 221, which passes through the opening 211 and faces the outside, may be fixed to the housing 210 by attaching the supporter 222 to the inner surface.

According to an embodiment, the grill 220 may be connected to the conductive pattern 250. The grill 220 and the conductive pattern 250 may be integrally formed. For example, the grill 220 and the conductive pattern 250 may be formed of a conductive portion of the same material. For another example, the grill 220 and the conductive pattern 250 may be formed of a single member by being fused, bonded, or attached by conductive tape. However, the disclosure is not limited thereto.

According to an embodiment, the grill 220 and the conductive pattern 250 are formed of a separate member, and a portion of the grill 220 may contact a portion of the conductive pattern 250. For example, a portion of the grill 220 may be connected to a bridge 253 of the conductive pattern 250. The bridge 253 may extend from a body portion 251 of the conductive pattern 250 to the grill 220. A portion of the bridge 253 may be connected in contact with a portion of the grill 220.

According to an embodiment, the body portion 251 of the conductive pattern 250 may be disposed in the inner surface 210*c* of the housing 220. The conductive pattern 250 attached to the inner surface 210*c* may be fixed to the housing 210 without being supported by a separate support member. The conductive pattern 250 may include an extension portion 252 extending from the body portion 251. The extension portion 252 may include a feeding point. For example, the extension portion 252 may include the feeding point fed from a wireless communication circuit disposed on a printed circuit board (e.g., the printed circuit board 260 of FIG. 2B). The conductive pattern 250 may be fed through the feeding point located in the extension portion 252 and may function as an antenna. At least a portion of the grill 220 including a conductive portion connected to the conductive pattern 250 may function as an antenna.

According to an embodiment, the grill 220 integrally formed with the conductive pattern 250 may be inserted into the opening 211 and fixed to the housing 210. The grill 220 may be inserted into the opening 211, and the conductive pattern 250 may be disposed in the inner surface 210*c* of the housing 210. The conductive pattern 250 may be disposed to be in contact with a portion of the grill 220. The conductive pattern 250 disposed to contact a portion of the grill 220 may be electrically connected to the conductive portion of the grill 220. The conductive pattern 250 may be electrically coupled to the grill 220 to increase a length of a pattern of an antenna radiator, thereby improving a quality of a signal having a low frequency band.

According to an embodiment, since the wearable device 100 does not include a support member (e.g., a carrier) for fixing the conductive pattern 250 in the housing 210, material cost and processing cost may be reduced. The wearable device 100 may integrally form the conductive pattern 250 and the grill 220 to secure an electrical length of the antenna for a resonance frequency.

Figure 4:
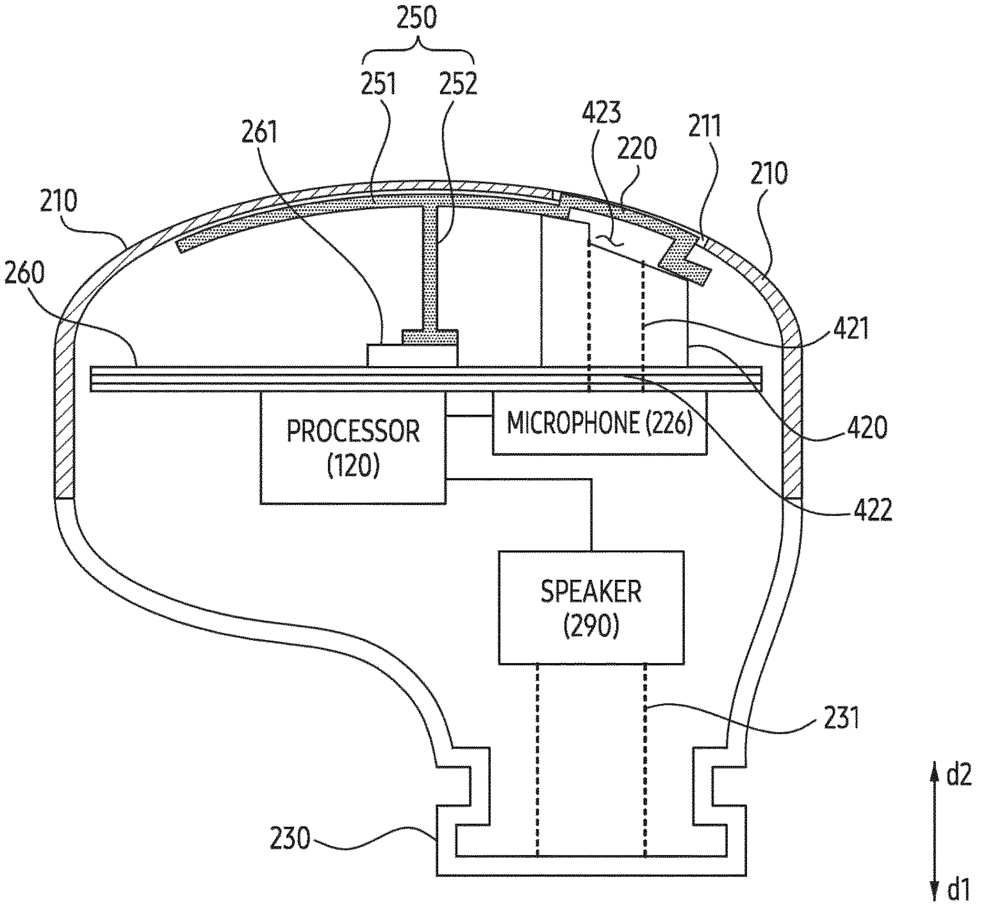
FIG. 4 is a cross-sectional view of a wearable device according to various embodiments.

FIG. 4 is a cross-sectional view of an example wearable device according to various embodiments.

Referring to FIG. 4, a wearable device 100 may include a microphone 226, a grill 220, a conductive pattern 250, a processor 120 (e.g., the processor 120 of FIG. 1), and a speaker 290. According to an embodiment, the microphone 226 may obtain an audio signal. The microphone 226 may obtain an audio signal transmitted through an opening 211 and an acoustic path 421. The microphone 226 may transmit information related to the obtained audio signal to the processor 120.

According to an embodiment, the speaker 290 may transmit an audio signal to the outside. The audio signal emitted from the speaker 290 may be emitted to the outside through an acoustic duct 231 included in a nozzle 230. The speaker 290 may convert an electrical signal of data transmitted from the processor 120 into an audio signal. The acoustic duct 231 may be a through hole formed in a nozzle 230, or may be a passage for transmitting the converted audio signal to the outside.

According to an embodiment, the grill 220 and the conductive pattern 250 may operate as an antenna element or a touch sensor. The grill 220 and the conductive pattern 250 may be integrally formed or connected to each other. The grill 220 may include a conductive portion, or at least a portion thereof may be formed of a conductive portion. The conductive pattern 250 may be electrically connected or coupled to the conductive portion of the grill 220. The conductive pattern 250 may include a body portion 251 formed of a conductive material and an extension portion 252 extending from the body portion 251. The body portion 251 may be used as an antenna pattern, and the extension portion 252 may be electrically coupled to a printed circuit board 260 to receive a current. According to an embodiment, the body portion 251 of the conductive pattern 250 and the grill 220 may operate as touch sensors detecting access of an external object. The conductive pattern 250 and the grill 220 may obtain sensing data of changed capacitance of the conductive portion of the conductive pattern 250 and the grill 220 according to the access of the external object.

According to an embodiment, the processor 120 may be electrically connected to the microphone 226, the speaker 290, the antenna pattern, and the touch sensor. The antenna pattern may include a conductive pattern 250 and the grill 220. The touch sensor may include the conductive pattern 250 and the grill 220. The conductive pattern 250 and the grill 220 may be used as an antenna pattern or a pattern for a touch sensor. The processor 120 may be at least one or more processors including a communication processor and/or an application processor.

According to an embodiment, the processor 120 may be configured to communicate with an external electronic device through the conductive pattern 250 and the conductive portion of the grill 220. The processor 120 may transmit a signal for transmission to the external electronic device through the conductive pattern 250 and the conductive portion of the grill 220. For example, the processor 120 may be electrically connected to the conductive pattern 250 and the grill 220 through a coupling or contact of the extension portion 252 of the conductive pattern 250 and a connection member 261 disposed on and the printed circuit board 260. The conductive pattern 250 and the grill 220 fed from the processor 120 may function as an antenna radiator. According to an embodiment, the conductive pattern 250 and the grill 220 may function as an inverted F antenna, a patch antenna, or a monopole antenna.

According to an embodiment, the processor 120 may obtain data related to the access of the external object, based on a value of the changed capacitance. The processor 120 may identify a non-access of the external object when the value of the capacitance is lower than a reference value, and identify the access of the external object when the value of the capacitance is higher than the reference value. For another example, the processor 120 may compare the obtained value of the capacitance with a plurality of reference values or ranges to identify the access and/or contact of the external object. The processor 120 may identify the non-access of the external object when the value of the capacitance is lower than a first reference value, identify that the external object is located within a specified distance from the wearable device 100 when the value of the capacitance is greater than or equal to the first reference value and less than or equal to a second reference value, and identify that the external object contacts the wearable device 100 when the value of the capacitance is greater than or equal to a second reference value.

According to an embodiment, the processor 120 may convert an electrical signal into a first audio signal, and transmit the first audio signal to the outside, through the speaker 290. The processor 120 may transmit the electrical signal to the speaker 290 to convert the electrical signal into the first audio signal. The first audio signal may be emitted to the outside in a first direction through the acoustic duct of the nozzle 230 connected to a vibration plate (e.g., a diaphragm) of the speaker 290.

According to an embodiment, the processor 120 may obtain a second audio signal through the microphone 226. The microphone 226 may obtain a second audio signal transmitted from the acoustic path through a microphone hole 422. The second audio signal may be introduced into the housing 210 through the opening 211. The second audio signal introduced into the housing 210 may be transmitted to the microphone 226 along the acoustic path 421 and the microphone hole 422. The microphone hole 422 may be formed to penetrate the printed circuit board 260. The acoustic path 421 may be disposed between the opening 211 and the microphone hole 422. The acoustic path 421 may connect the opening 211 and the microphone hole 422. For example, the opening 211 may include a space 423 formed by the grill 221, and the space 423 may be connected to the acoustic path 421. The acoustic path 421 may connect the opening 211, the space 423, and the microphone hole 422, to transmit the second audio signal to the microphone 226. For example, the acoustic path 421 may be a path for transmitting the second audio signal to the microphone, and may be a through hole formed in a porous member 420 disposed between the microphone 226 and the opening 211. The porous member 420 may prevent and/or reduce sound leakage of the second audio signal transmitted to the microphone 226. The second audio signal may be an audio signal obtained from the periphery of the wearable device 100.

According to an embodiment, the processor 120 may be configured to obtain a first audio signal corrected based on the second audio signal. The processor 120 may be configured to obtain a second audio signal introduced from a second direction through a first microphone, and correct the first audio signal based on the second audio signal.

The wearable device 100 according to an embodiment may utilize the conductive pattern 250 and the grill 220 as an antenna element. The wearable device 100 may secure an electrical length of the antenna by extending an electrical length of the conductive pattern 250 used as an antenna to the grill 220, thereby improving a quality of a signal in a low frequency band. The wearable device 100 may provide an extended touch area by extending the conductive pattern 250 used as an electrode of the touch sensor to an area in which the grill 220 is located.

Figure 5:
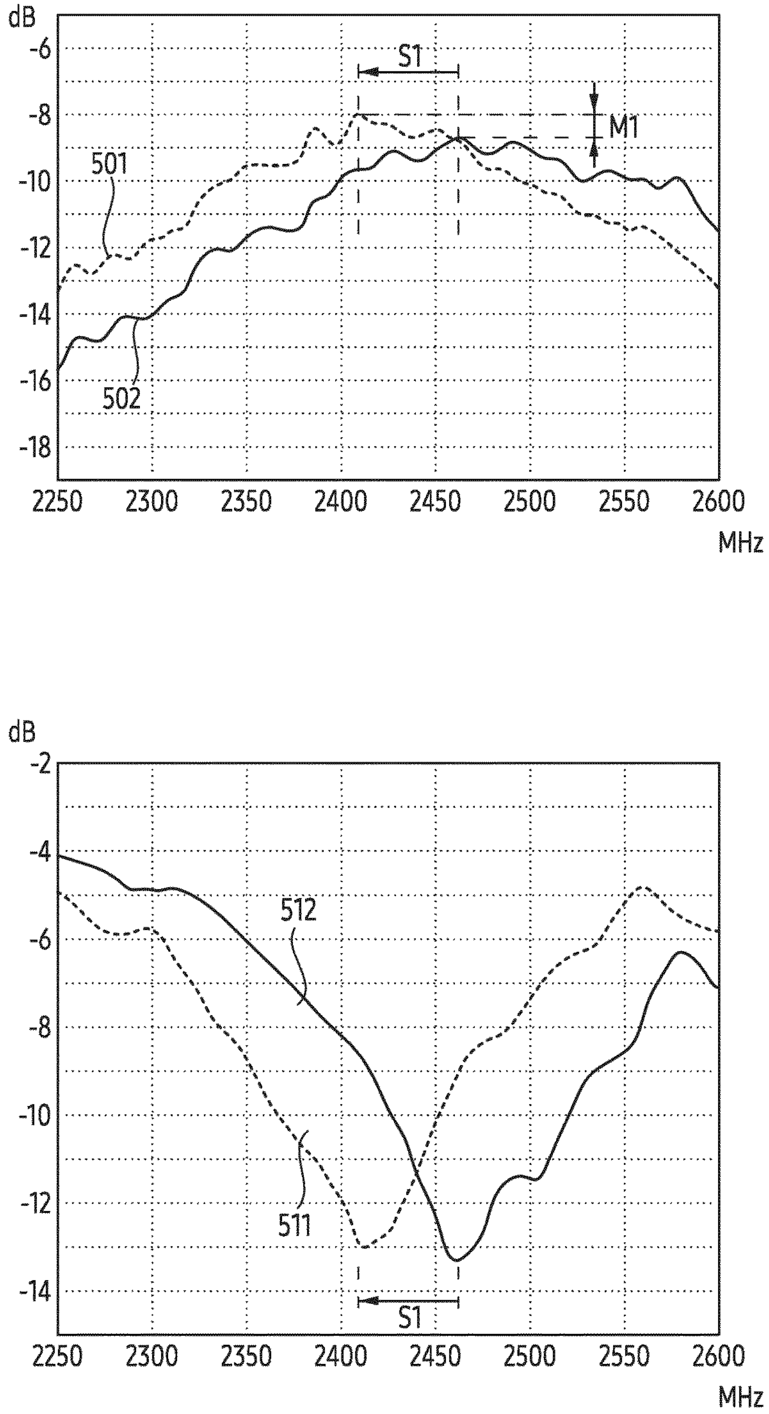
FIG. 5 includes graphs comparing antenna performance of a grill and a conductive pattern functioning as an antenna radiator and antenna performance of a conductive pattern functioning as an antenna radiator according to various embodiments.

FIG. 5 includes graphs comparing antenna performance of a grill and a conductive pattern functioning as an antenna radiator and antenna performance of a conductive pattern functioning as an antenna radiator according to various embodiments.

Referring to FIG. 5, a graph 501 illustrates efficiency of an antenna using a conductive pattern 250 (e.g., the conductive pattern 250 of FIG. 2B) and a grill 220 (e.g., the grill 220 of FIG. 2B) included in a wearable device 100 (e.g., the wearable device 100 of FIG. 2), which are integrally formed or electrically connected, as an antenna radiator, and a graph 502 illustrates efficiency of an antenna using only a conductive pattern formed in a carrier according to a comparative example as an antenna radiator.

In the graph 501, a resonance frequency may be shifted downward by SI than that of the graph 502. In case that only the conductive pattern formed in the carrier is used as an antenna radiator, an electrical length of the antenna for forming a resonance frequency of the antenna may be short, so that the resonance frequency of the graph 502 may be relatively higher than that of the graph 501.

According to an embodiment, in case that the conductive pattern 250 and a conductive portion of the grill 220 is used as an antenna, an electrical length of the antenna for forming a resonance frequency may be secured, so that a resonance frequency of the graph 501 may be 2.4 GHz, which is a target resonance frequency. In order to secure an electrical length of an insufficient antenna, the conductive pattern 250 and the grill 220 may be integrated and used as an antenna.

The graph 501 may have more gains than the graph 502. For example, the highest gain of the graph 501 may be higher by MI than the highest gain of the graph 502. According to an embodiment, the antenna formed of the grill 220 connected to the conductive pattern 250 may have an increased gain by an expanded extent of an antenna radiation.

A graph 511 represents reflection efficiency of an antenna using the conductive pattern 250 and the grill 220 included in the wearable device 100 according to an embodiment, which are integrally formed or electrically connected, as the antenna radiator, and a graph 512 represents reflection efficiency of an antenna using only the conductive pattern formed in the carrier according to the comparative example as an antenna radiator. Comparing the graph 511 with the graph 512, a resonance frequency of the graph 511 may be shifted downward by SI than that of the graph 512.

According to an embodiment, an antenna using the conductive pattern 250 and the grill 220 included in the wearable device 100 according to an embodiment, which are integrally formed or electrically connected, as an antenna radiator may have an enough electrical length for forming a resonance frequency in a low frequency band than in case that only the conductive pattern 250 is used as an antenna radiator. The wearable device 100 may secure an electrical length of an antenna for obtaining a target resonance frequency (e.g., 2.4 GHZ).

According to an embodiment, since the conductive pattern 250 and the grill 220 are integrally formed, an antenna of the wearable device 100 may reduce a presence of a conductive member around the antenna. According to removing an interference factor and increasing of an extent of an antenna radiator, gain of the antenna may increase.

Figure 6:
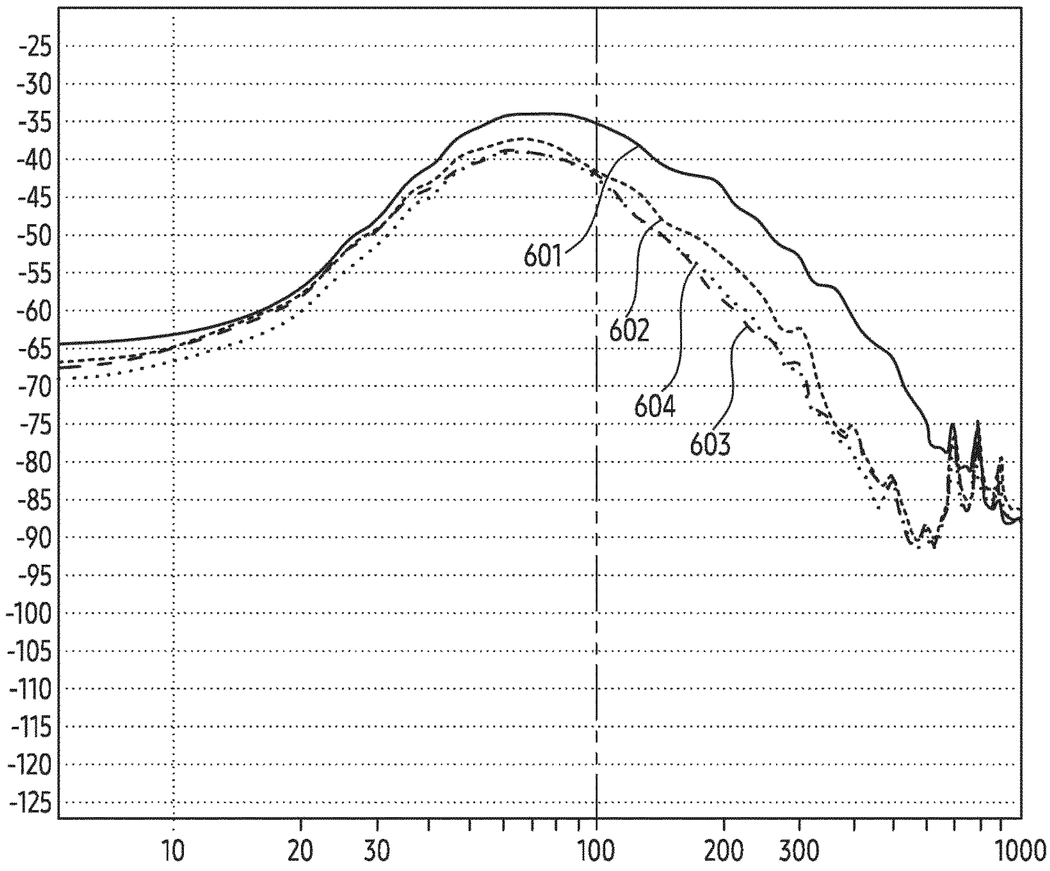
FIG. 6 is a graph comparing a degree of noise blocking of a wearable device and other devices according to various embodiments.

FIG. 6 is a graph comparing a degree of noise blocking of a wearable device and other deformed devices according to various embodiments.

Referring to FIG. 6, a graph 601 represents degree of blocking of noise transmitted from the outside when a grill of a microphone does not exist. A graph 602 represents degree of blocking of noise transmitted from the outside when a microphone grill is added and separated from a conductive pattern of an antenna. A graph 603 represents degree of blocking of noise transmitted from the outside when a microphone grill and an antenna conductive pattern are integrally formed.

A graph 604 represents degree of blocking of noise transmitted from the outside when a microphone grill and a porous member (e.g., sponge) surrounding an acoustic path disposed between a microphone and a grill are included.

The graphs 601, 602, 603, and 604 represent a size of an audio signal of an introduced noise Comparing the graph 601 with remaining graphs 602, 603, and 604, the remaining graphs 602, 603, and 604 represent cases in which a lower noise than that of the graph 601 is introduced. The graph 601 represents a case in which a size of an audio signal of a noise is higher than that of the remaining graphs 602, 603, and 604 in most frequency bands. For example, the graph 601 represents a case in which a noise in a frequency range of 30 Hz to 1000 Hz, which is a low frequency range, is higher than that of the remaining graphs by approximately 10 dB to 30 dB. When a microphone grill does not exist, the size of the noise introduced into the wearable device may be 10 to 1000 times higher.

It may be seen that the graphs 602, 603, and 604 have almost similar noise blocking performance as a whole. The size of noise introduced into the wearable device 100 in which the grill (e.g., the grill 220 of FIG. 2B) and the conductive pattern (e.g., the conductive pattern 250 of FIG. 2B) for an antenna are integrally formed may be substantially the same as the size of noise introduced into the wearable device 100 from which the grill and the conductive pattern for the antenna are separated.

According to an embodiment, the graph 604 representing the size of noise introduced into the wearable device in case that a porous member (e.g., the porous member 420 of FIG. 5) is disposed between the grill 220 and the microphone 226 of FIG. 2B represents the lower size of noise by about 5 dB lower in a low frequency band (500 Hz less than or equal to) than that of the graphs 602 and 603 representing the size of noise introduced into the wearable device including the grill and transmitted to a user. As the porous member forming the acoustic path prevents/reduces noise from leaking out of the acoustic path, the wearable device may correct an audio signal transmitted to the user based on a waveform of the noise transmitted to the microphone and efficiently perform noise blocking by transmitting the corrected signal to the user.

Figure 7A:
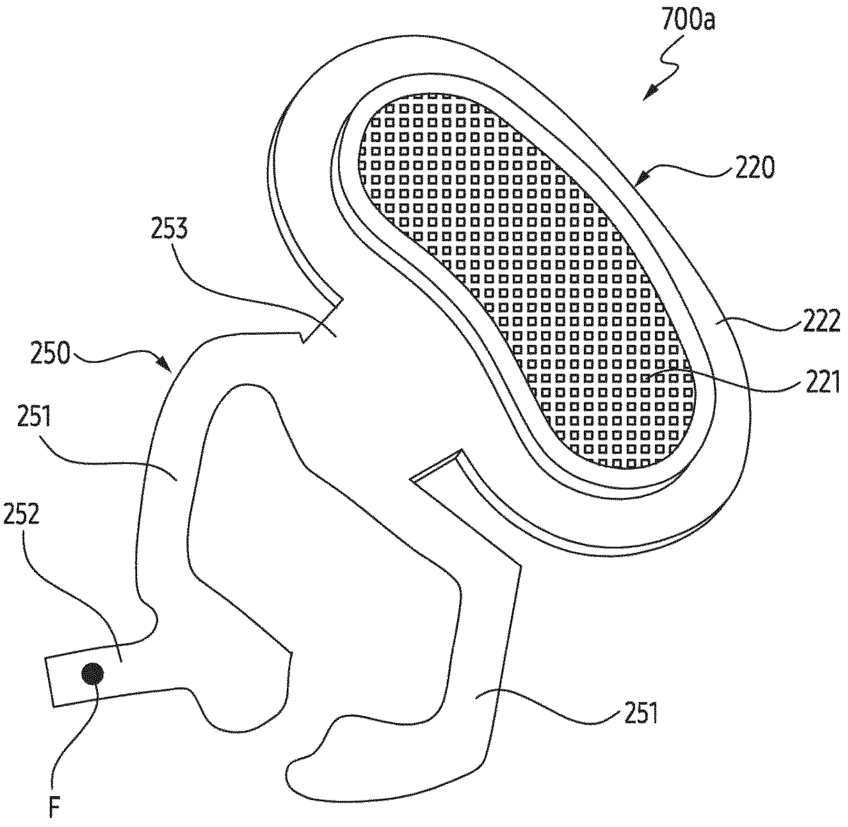
FIG. 7A is a perspective view illustrating an antenna element including a conductive pattern and a grill included in a wearable device according to various embodiments.
Figure 7B:
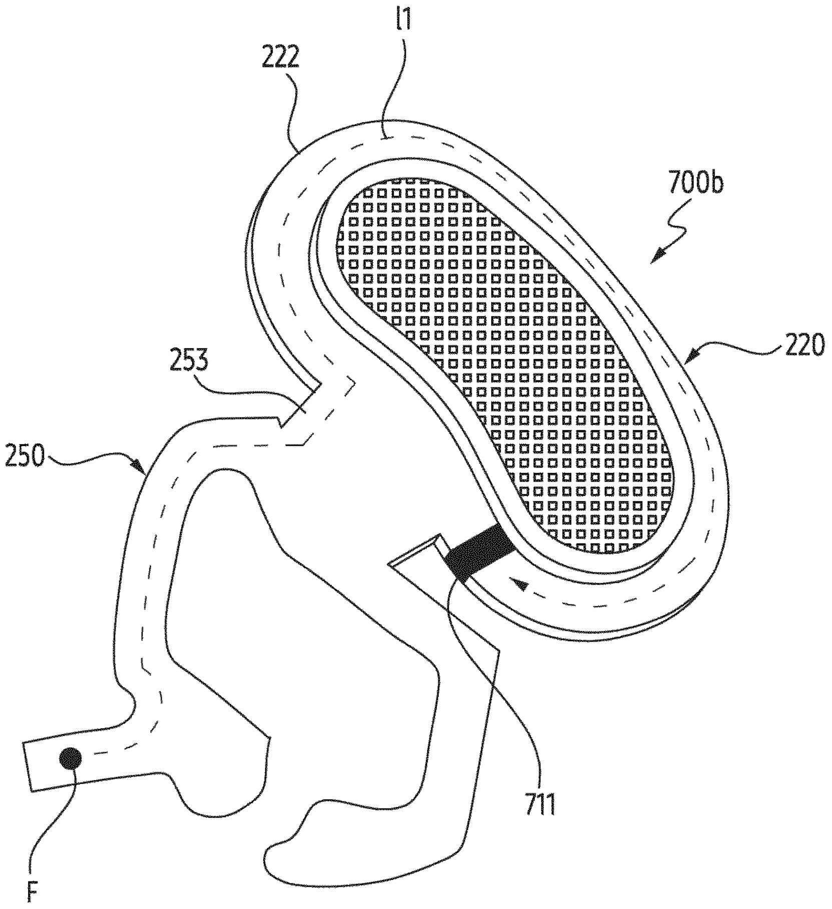
FIG. 7B is a perspective view illustrating an antenna element including a segmentation part that segments the supporter of FIG. 7A according to various embodiments.
Figure 7C:
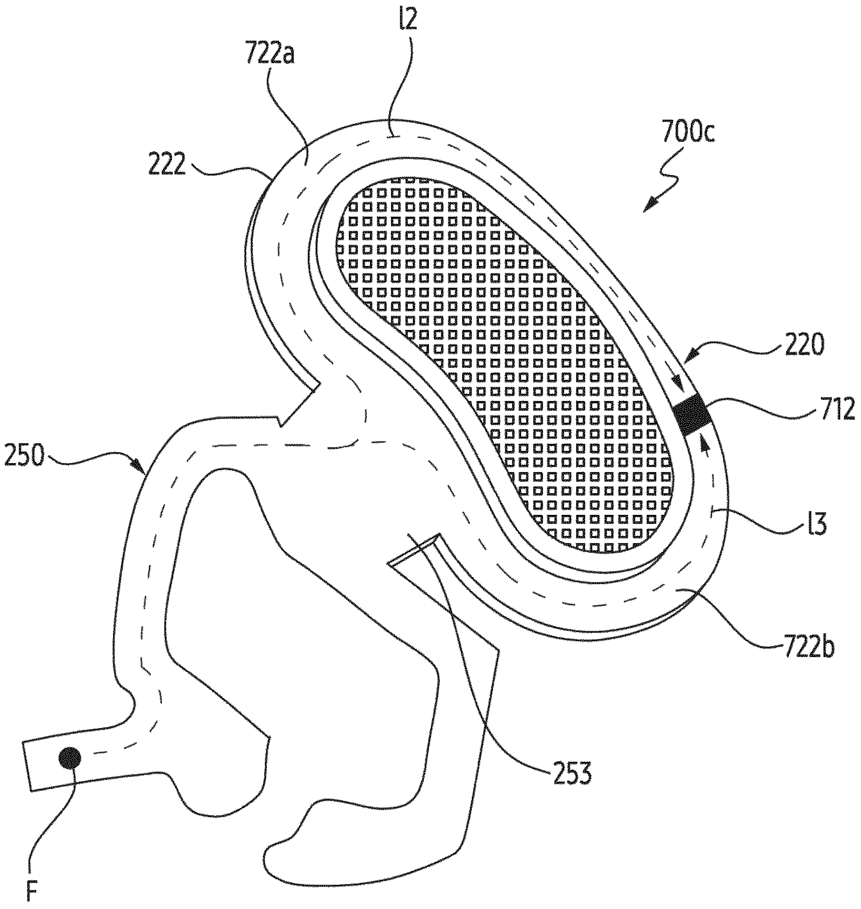
FIG. 7C is a diagram illustrating an antenna element in which a position of the segmentation part of FIG. 7B is deformed according to various embodiments.

FIG. 7A is a perspective view illustrating an example antenna element including a conductive pattern and a grill included in a wearable device according to various embodiments. FIG. 7B is a perspective view illustrating the antenna element including a segmentation part that segments the supporter of FIG. 7A according to various embodiments. FIG. 7C is a perspective view illustrating the antenna element in which a position of the segmentation part of FIG. 7B is deformed according to various embodiments.

Referring to FIGS. 7A, 7B, and 7C, an antenna element *700a* may include a grill 220 and a conductive pattern 250. The grill 220 may include a mesh pattern 221 and a supporter (e.g., a support) 222. The conductive pattern 250 may include a body portion 251, an extension portion 252, and a bridge 253. The extension portion 252 may include a feeding point F fed through a connection member 261 of a printed circuit board (e.g., the printed circuit board 260 of FIG. 2B). The grill 220 and the conductive pattern 250 may include a conductive portion. The entire conductive pattern 250 may be formed of a conductive portion. At least a portion of the grill 220 may be formed of a conductive portion. For example, the entire grill 220 including the mesh pattern 221 and the supporter 222 may be formed of a conductive portion. For another example, the supporter 222 of the grill 220 may be formed of a conductive portion, and the mesh pattern 221 may be formed of a non-conductive portion.

According to an embodiment, the grill 220 and the conductive pattern 250 may be electrically connected to each other. The grill 220 may be integrally formed with the conductive pattern 250, or the grill 220 may be fused, bonded, or attached to the conductive pattern 250 by a conductive tape.

When the entire grill 220 is formed of a conductive portion, the conductive pattern 250 and the entire grill 220 may be used as an antenna radiator. When the mesh pattern 221 of the grill 220 is formed of a non-conductive portion and the supporter 222 is formed of a conductive portion, the conductive pattern 250 and the supporter 222 formed of the conductive portion may be used as an antenna radiator.

According to an embodiment, the supporter 222 may form a closed loop. The supporter 222 may be disposed in an opening (e.g., the opening 211 of FIG. 2A). When the mesh pattern 221 is formed of a non-conductive portion, or the mesh pattern 221 and the supporter 222 are electrically disconnected, a current may flow in the supporter 222 among components of the grill 220. The conductive pattern 250 and the supporter 222 formed of the conductive portion may be used as an antenna radiator. The current applied through the feeding point F may flow along the closed loop formed by the supporter 222 through the conductive pattern 250.

Referring to FIG. 7B, the supporter 222 may further include a non-conductive portion 711 segmenting a portion of the closed loop of the supporter 222.

According to an embodiment, the non-conductive portion 711 may be disposed adjacent to the bridge 253 in the supporter (e.g., support) 222. For example, the non-conductive portion 711 may be disposed to be in contact with the bridge 253, and may be configured such that the current applied from the feeding point F may flow along a path 11. The non-conductive portion 711 may be configured to open a direction in which the path 11 proceeds in the supporter 222 connected to the bridge 253, and block a direction opposite to the direction in which the path 11 proceeds. The non-conductive portion 711 may be disposed on the right side of the supporter 222 in contact with the bridge 253. However, the disclosure is not limited thereto, and the non-conductive portion 711 may be configured to form an electrical path formed in a clockwise direction opposite to the path 11 formed in a counterclockwise direction.

According to an embodiment, as the entire closed loop of the supporter 222 may be secured as an electrical path for a resonance frequency of an antenna, securing a minimum length of the antenna may be easy.

Referring to FIG. 7C, the supporter 222 may include a non-conductive portion 712 segmenting a portion of the closed loop of the supporter 222.

According to an embodiment, the non-conductive portion 712 may be disposed apart from the bridge 253. For example, the non-conductive portion 712 may be disposed to be spaced apart from the bridge 253 along a portion of the closed loop of the supporter 222. The non-conductive portion 712 may include an electrical path 12 moving the closed loop in a counterclockwise direction from an area of the supporter 222 in contact with the bridge 253 and an electrical path 13 moving the closed loop in a clockwise direction from an area of the supporter 222 in contact with the bridge 253. For example, the non-conductive portion 712 may be configured so that a current applied from the feeding point F may flow along the electrical path 12 or the electrical path 13. For example, the non-conductive portion 712 may separate the supporter 222 into a first conductive portion 722*a* and a second conductive portion 722*b*. The first conductive portion 722*a* may form the electrical path 12 for forming a first resonance frequency of the antenna, and the second conductive portion 722*b* may form the electrical path 13 for forming a second resonance frequency of the antenna.

According to an embodiment, the supporter 222 may include the first conductive portion 772*a* and the second conductive portion 772*b*. The antenna operated by the supporter 222 and the conductive pattern 250 may function as a multi-band antenna. According to an embodiment, the supporter 222 and the conductive pattern 250 may function as a multi-antenna by further including a feeding point different from the feeding point F.

According to an embodiment, it is described that the supporter 222 has one segmentation part formed of a non-conductive portion, but is not limited thereto. The supporter 222 may include the non-conductive portion 711 of FIG. 7B and the non-conductive portion 712 of FIG. 7C. When segmented by a plurality of the non-conductive portions 711 and 712, a current applied from the feeding point F may flow only along the electrical path 12. The antenna radiator including the electrical path 12 may be configured to have the first resonance frequency.

According to an embodiment, the grill 220 and the conductive pattern 250 may be integrally formed and used as an antenna. As an area capable of being used as an antenna radiator extends from the conductive pattern 250 to the grill 220, the antenna elements 700*a*, 700*b*, and 700*c* may provide an electrical length for securing a resonance frequency. When only the supporter 222 of the grill 220 is configured as a conductive portion, an antenna element 700*b* or 700*c* of the wearable device may be set to one of various frequencies by a non-conductive portion 711 or 712 included in the supporter 222. The supporter 222 segmented by the non-conductive portion 711 or 712 may function as a multi-band antenna or a multi-antenna.

Figure 8A:
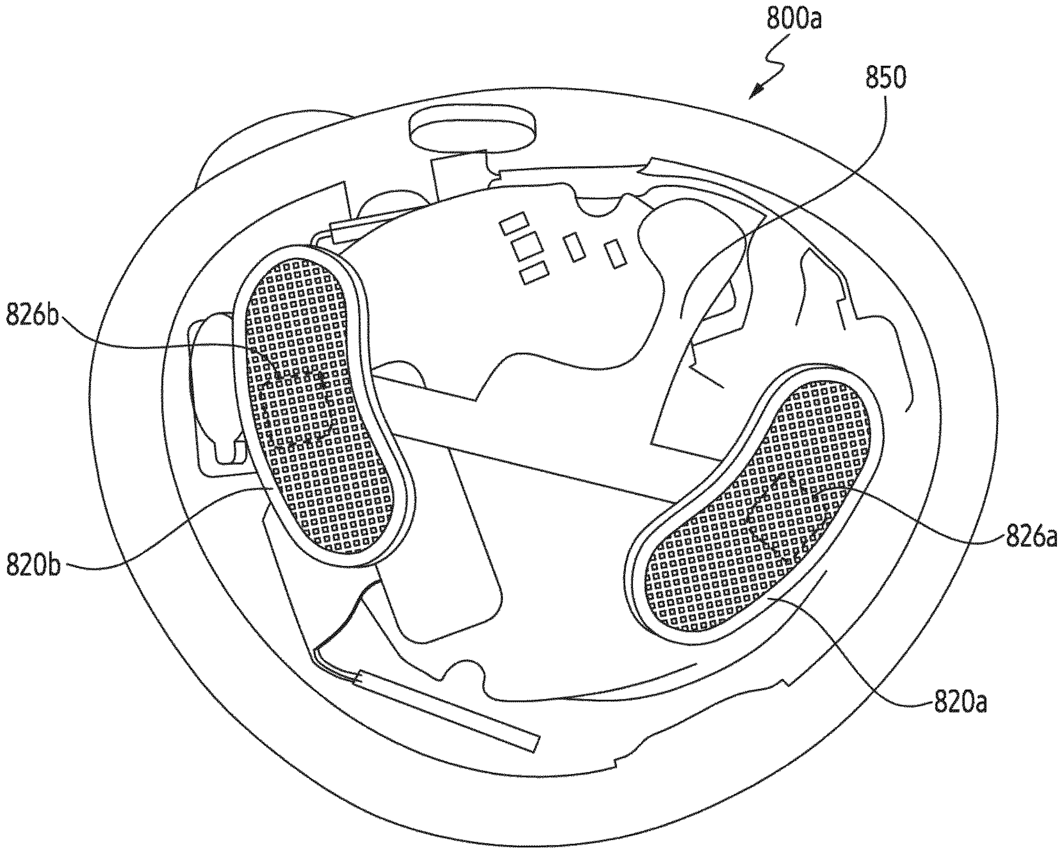
FIG. 8A is a diagram illustrating an example of an antenna element including a plurality of grills according to various embodiments.
Figure 8B:
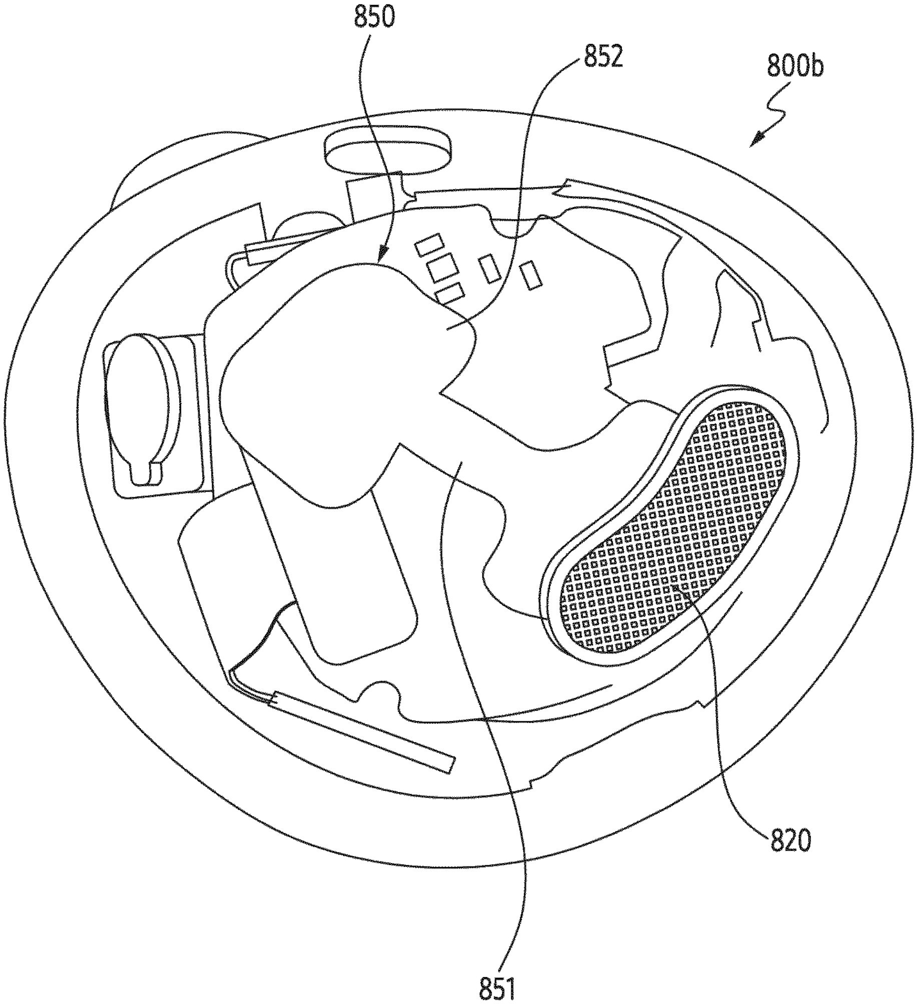
FIGS. 8B and 8C are diagrams illustrating an antenna according to a shape of a conductive pattern according to various embodiments.
Figure 8C:
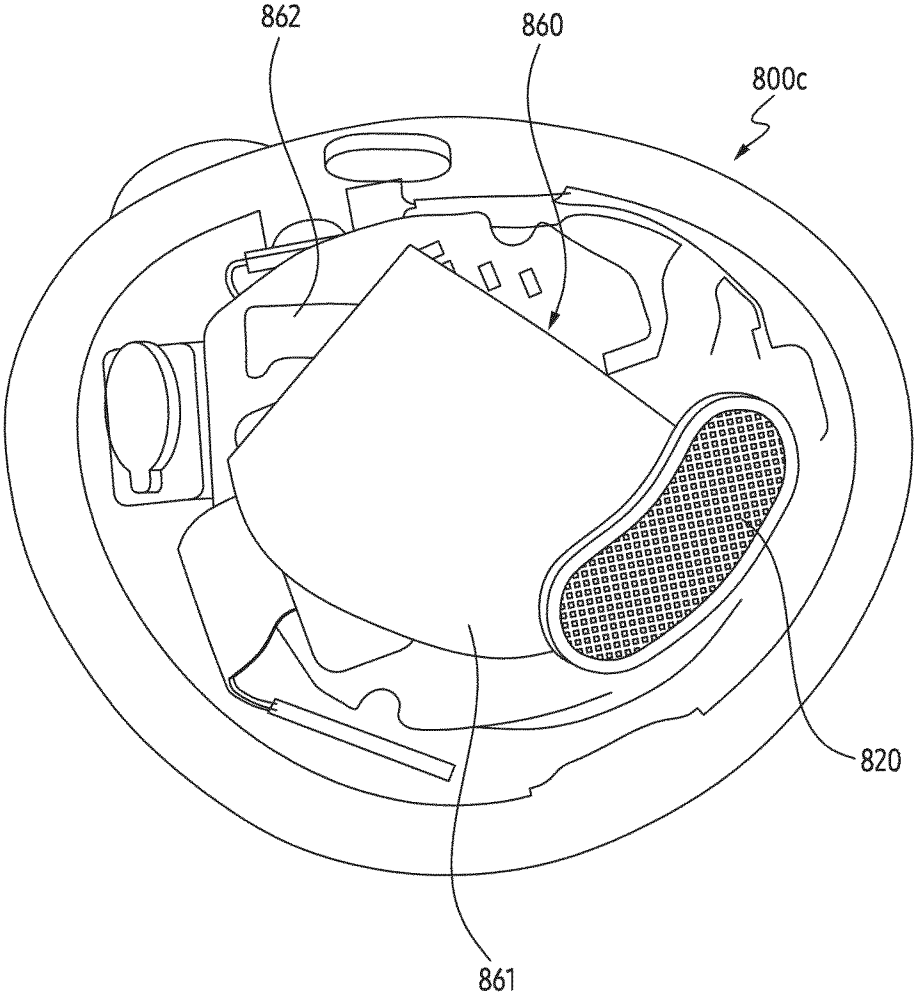

FIG. 8A is a diagram illustrating an example of an antenna element including a plurality of grills according to various embodiments. FIGS. 8B and 8C are diagrams illustrating example antennas according to a shape of a conductive pattern according to various embodiments.

Referring to FIG. 8A, a wearable device 800*a* may include a plurality of microphones 826*a* and 826*b*, a conductive pattern 850, and a plurality of grills 820*a* and 820*b*.

According to an embodiment, the wearable device 800*a* may include the first microphone 826*a* (e.g., the microphone 226 of FIG. 2B) and the second microphone 826*b* spaced apart from the first microphone 826*a*. The first microphone 826*a* may receive a first audio signal introduced from a first opening (e.g., the opening 211 of FIG. 2A), and the second microphone 826*b* may receive a second audio signal distinct from the first audio signal. The second microphone 826*b* may receive the second audio signal from a second opening (e.g., the opening 211 of FIG. 2A) distinct from the first opening.

According to an embodiment, the wearable device 800*a* may include the first grill 820*a* overlapped with the first microphone 826*a* at least partially and the second grill 820*b* overlapped with the second microphone 826*b* at least partially. The first grill 820*a* may surround the first opening connected to the first microphone 826*a*, and the second grill 820*b* may surround the second opening connected to the second microphone 826*b*.

According to an embodiment, each of the first grill 820*a* and the second grill 820*b* may include a conductive portion. The conductive pattern 850 may be connected to each of the first grill 820*a* and the second grill 820*b*. The conductive pattern 850 may be connected to the conductive portion of the first grill 820*a* and the conductive portion of the second grill 820*b*, and may be formed as an antenna radiator.

Referring to FIG. 8B, a wearable device 800*b* may include a grill 820 and a conductive pattern 850. The grill 820 may be the same as the grill 220 of FIG. 2A or the first grill 820*a* of FIG. 8A.

The conductive pattern 850 may include a patch area 852 and a connection area 851. The conductive pattern 850 and the grill 820 may be formed as a patch antenna. According to an embodiment, the patch area 852 may function as a patch antenna by a current supplied from a feeder.

Referring to FIG. 8C, a wearable device 800*c* may include a grill 820 and a conductive pattern 860. The grill 820 may be the same as the grill 220 of FIG. 2A or the first grill 820*a* of FIG. 8A.

The conductive pattern 860 may be formed integrally with the grill 820, and may include a plate 861 and at least one extension portion 862 extending from the plate 861. One of the at least one of the extension portion 862 may be fed through a feeder, and a remaining one of the at least one of the extension portion 862 may be electrically connected to a ground portion of a printed circuit board 260 through a ground portion. The plate 861 of the conductive pattern 860 and the grill 820 may function as a radiator, and may function as an inverted F antenna (IFA).

According to an embodiment, the wearable device 800*a*, 800*b*, or 800*c* may form various types of patterns by attaching the conductive pattern to an inner surface of a housing. The conductive pattern may function as various types of antennas through coupling with the grill 820.

Figure 9A:
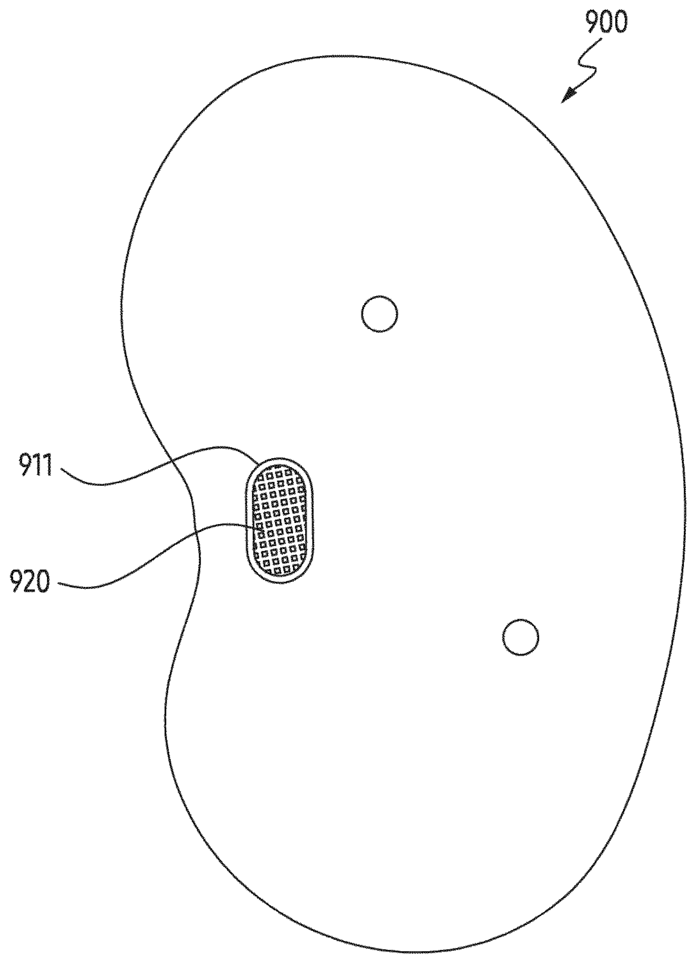
FIGS. 9A and 9B are a perspective view and a side view illustrating an example of a wearable electronic device connecting a grill disposed in a ventilation hole and a conductive pattern, according to various embodiments.
Figure 9B:
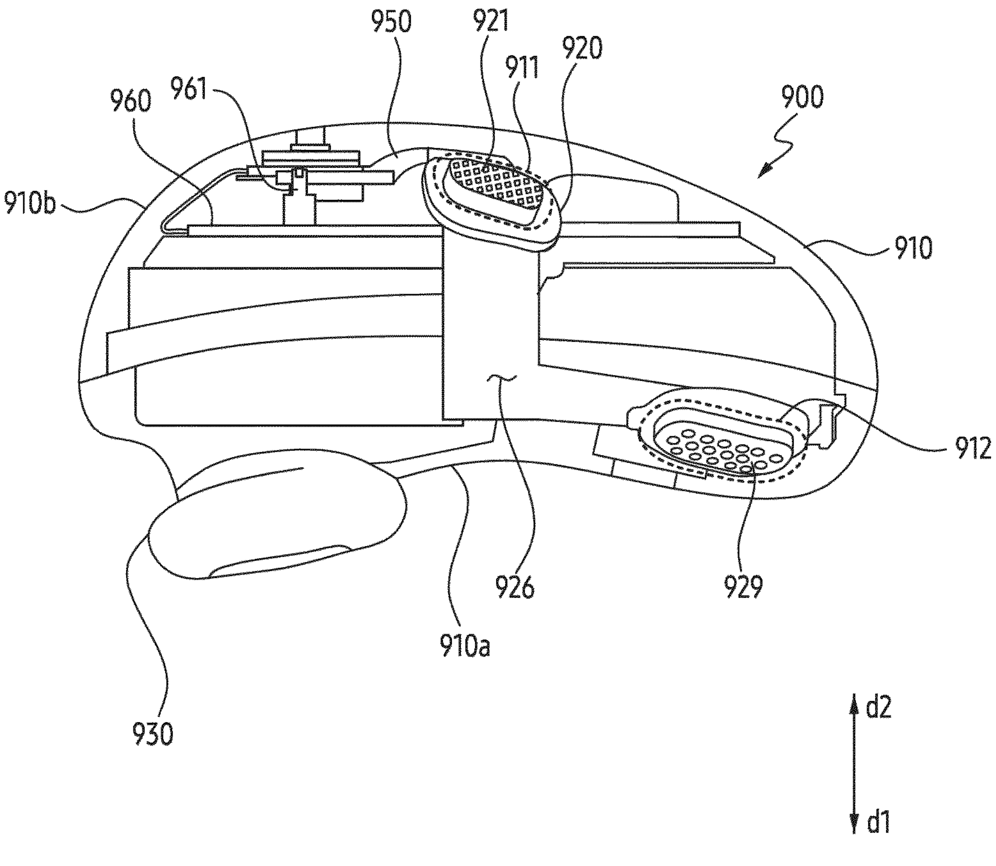
Figure 10A:
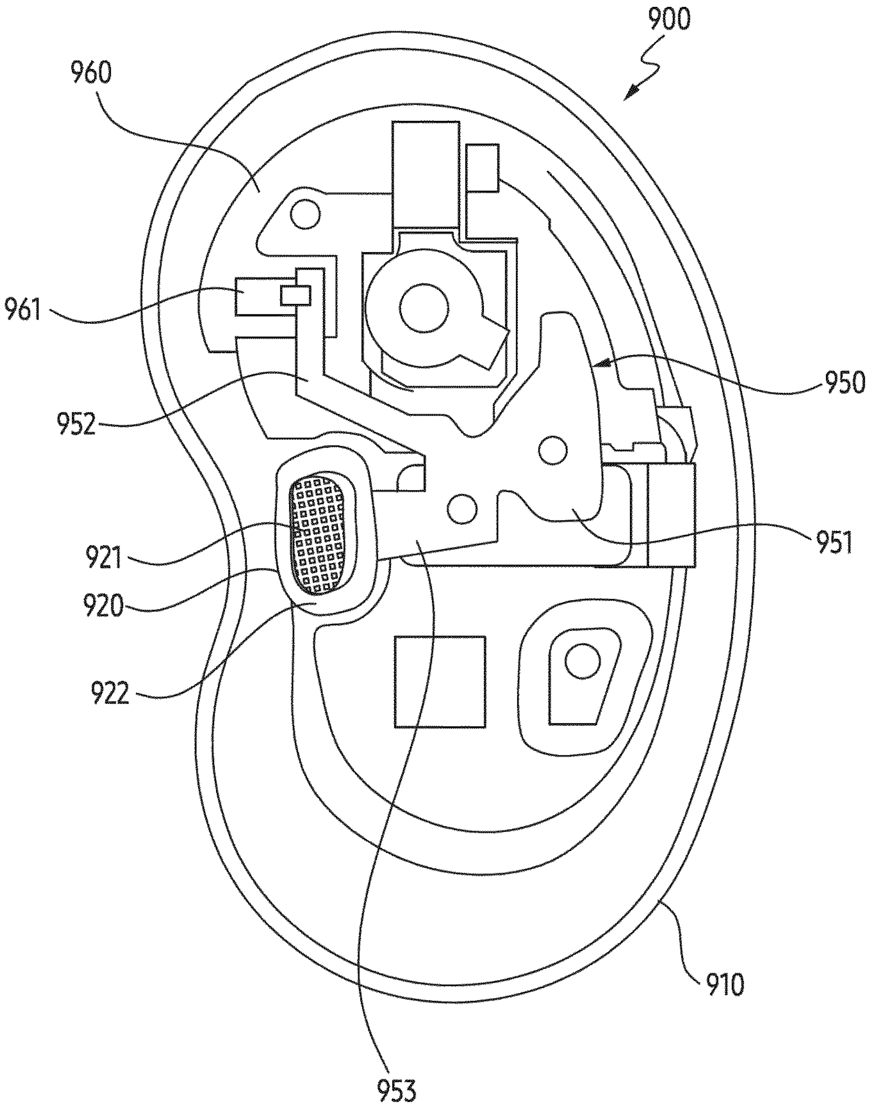
FIGS. 10A and 10B are diagrams illustrating a plan view in which a portion of the housing of the electronic device of FIG. 9A is removed, and a bottom view of a portion of the housing according to various embodiments.
Figure 10B:
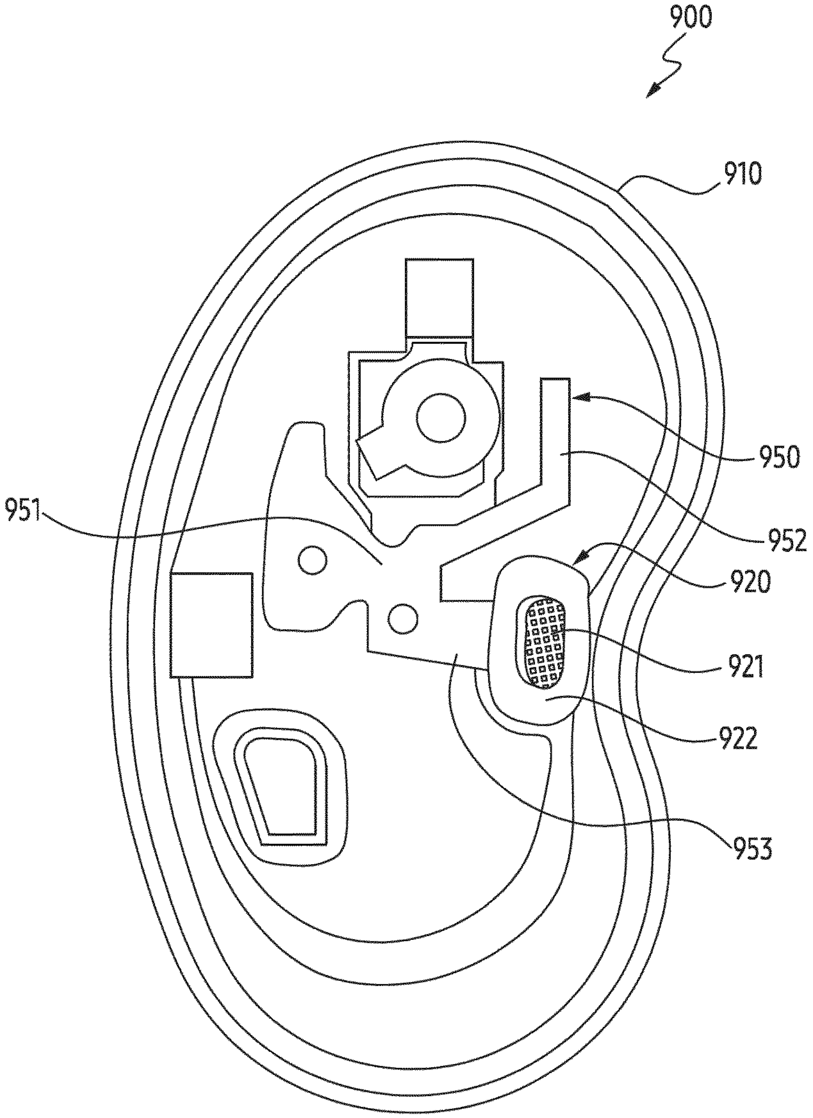

FIGS. 9A and 9B are a perspective view and a side view illustrating an example of a wearable electronic device connecting a grill disposed in a ventilation hole and a conductive pattern, according to various embodiments. FIGS. 10A and 10B are diagrams illustrating a top plan view in which a portion of the housing of the electronic device of FIG. 9A is removed and a bottom view of a portion of the housing according to various embodiments.

Referring to FIGS. 9A and 9B, a wearable device 900 (e.g., the wearable device 100 of FIG. 2A) may include a housing 910 (e.g., the housing 210 of FIG. 2A), a first grill 920 (e.g., the grill 220 of FIG. 2A), a second grill 929, and a conductive pattern 950 (e.g., the conductive pattern 250 of FIG. 2A). The housing 910 may be similar to or may be the same as the housing 210 of FIGS. 2A, 2B, and 2C. Contents overlapped those described in FIGS. 2A, 2B, and 2C may not be repeated here. The housing 910 may surround an inner space of the wearable device 900. The housing 910 may be connected to a nozzle 930 transmitting an audio signal to the outside of the wearable device 900. The nozzle 930 may be integrated with or assembled to the housing. The housing 210 may include a first surface 910*a* facing a first direction d1 in which a transmission path of the audio signal extends, and a second surface 910*b* including a first opening 911 facing a second direction d2 different form the first direction d1. The first surface 910*a* may include a second opening 912 facing the first direction d1.

According to an embodiment, the wearable device 900 may further include a ventilation hole 926 connecting the first opening 911 and the second opening 912. The ventilation hole 926 may connect the inside and the outside of a user's car, which is blocked by the wearable device 900 that is an earphone. For example, the ventilation hole 926 may connect the first opening 911 and the second opening 912 to ventilate air between the outside in which the second surface 910*b* in which the first opening 911 is formed faces and the inside of car in which the first surface 910*a* in which the second opening 912 is formed faces. A difference in air pressure between the inside and the outside of the car may be removed by the ventilation hole 926.

According to an embodiment, the wearable device 900 may include the grills 920 and 929 surrounding the openings 911 and 912, which are formed at both ends of a ventilation hole 926. The grills 920 and 929 may reduce the inflow of a foreign substance into the ventilation hole 926. The first grill 920 may surround the first opening 911. The second grill 929 may surround the second opening 912. The first grill 920 and/or the second grill 929 may be formed of a conductive material.

According to an embodiment, the first grill 920 may include a mesh pattern 921 and a supporter 922. The second grill 929 may have a similar or a same structure as the first grill 920. The first grill 920 may be electrically connected to the conductive pattern 950. The conductive pattern 950 may be connected to a printed circuit board 960 disposed inside the housing 910. The printed circuit board 960 may be connected to the conductive pattern 950 through a connection member 961.

A configuration of the wearable device 900 described above may have a different appearance of the wearable device 100 of FIGS. 2A and 2B, but may be the same or similar except for a configuration of the ventilation hole 926, the first grill 920, and the second grill 929. Among the configurations of the wearable device 900, descriptions of overlapping configurations are excluded.

According to an embodiment, it may be electrically connected to the first grill 920 in order to compensate an insufficient antenna length of the conductive pattern 950. The conductive pattern 950 may be configured to be integrally formed with the first grill 920 or in contact with the first grill 920 to function as an antenna element together with the first grill 920.

Referring to FIGS. 10A and 10B, the conductive pattern 950 may include a body portion 951, an extension portion 952, and a bridge 953. The first grill 920 may include the mesh pattern 921 and the supporter 922. A structure of the first grill 920 and the conductive pattern 950 may be the same as or similar to the structure of the grill 220 and the conductive pattern 250 of FIGS. 2B and 2C. Among the structure of the first grill 920 and the conductive pattern 950, descriptions overlapping those of FIGS. 2B and 2C may not be repeated here.

According to an embodiment, the body portion 951 may form an overall shape of the conductive pattern 950. An antenna structure of the conductive pattern 950 may be determined according to a shape of the body portion 951 or a connection shape with the first grill 920. For example, the conductive pattern 250 and the first grill 920 may be connected to each other and may function as a patch antenna, a monopole antenna, an F antenna, an inverted F antenna, or a dipole antenna. However, the disclosure is not limited thereto.

According to an embodiment, the conductive pattern 950 may be electrically connected to the connection member 961 on the printed circuit board 960 through the extension portion 952. The conductive pattern 950 may receive power from a wireless communication circuit disposed on the printed circuit board 960 through the connection member 961, and emit an electromagnetic wave to the outside of the wearable device 900.

According to an embodiment, the conductive pattern 950 may be connected to the first grill 920 through the bridge 953. For example, the bridge 953 may electrically connect the body portion 951 of the conductive pattern 950 to the supporter 922 of the first grill 920. The first grill 920 may include the mesh pattern 921 and the supporter 922. The first grill 920 may include a conductive portion. The conductive portion may be the entire first grill 920 including the mesh pattern 921, the supporter 922, or the mesh pattern 921 and the supporter 922. For example, when only the supporter 922 is formed in a conductive pattern, it may be configured as FIG. 7A, 7B, or 7C. For example, an entire closed loop of the supporter 922 may be used as an antenna radiator. For another example, the wearable device 900 may include an antenna radiator having various electrical paths, by further including a non-conductive portion segmenting the closed loop of the supporter 922.

According to an embodiment, the conductive pattern 950 and the first grill 920 may be electrically connected to each other and may be used as a touch sensor detecting access or a contact of an external object. According to a combination of the conductive pattern 950 and the first grill 920, a recognizable area of the external object of the touch sensor may be expanded.

According to an embodiment, the conductive pattern 950 and the first grill 920 may be attached to an inner surface of the housing 910. The wearable device 900 may fix an antenna by the conductive pattern 950 fixed to the inner surface of the housing 910, without a carrier formed of a non-conductive material fixing an antenna pattern. Since the carrier is not included, the wearable device 900 may efficiently use the inner space.

According to an embodiment, the wearable device 900 may secure an electrical length of an antenna for forming a resonance frequency by combining the conductive pattern 950 and the conductive portion of the first grill 920. Not only the microphone grill 220 of FIGS. 2A, 2B, and 2C, the first grill 920, which is a grill of the ventilation hole 926 of an embodiment, may be used as a portion of the antenna radiator. According to an embodiment, the wearable device 900 (or the wearable device 100 of FIG. 2A) may be electrically connected to other conductive portions attached to the inner surface of the housing, so that the length of the antenna radiator may be extended or a touchable area may be extended. The wearable device 900 may utilize conductive portions located around the antenna radiator as an antenna radiator, thereby reducing antenna signal interference and deterioration in radiation performance due to the surrounding conductive portions.

Figure 11A:
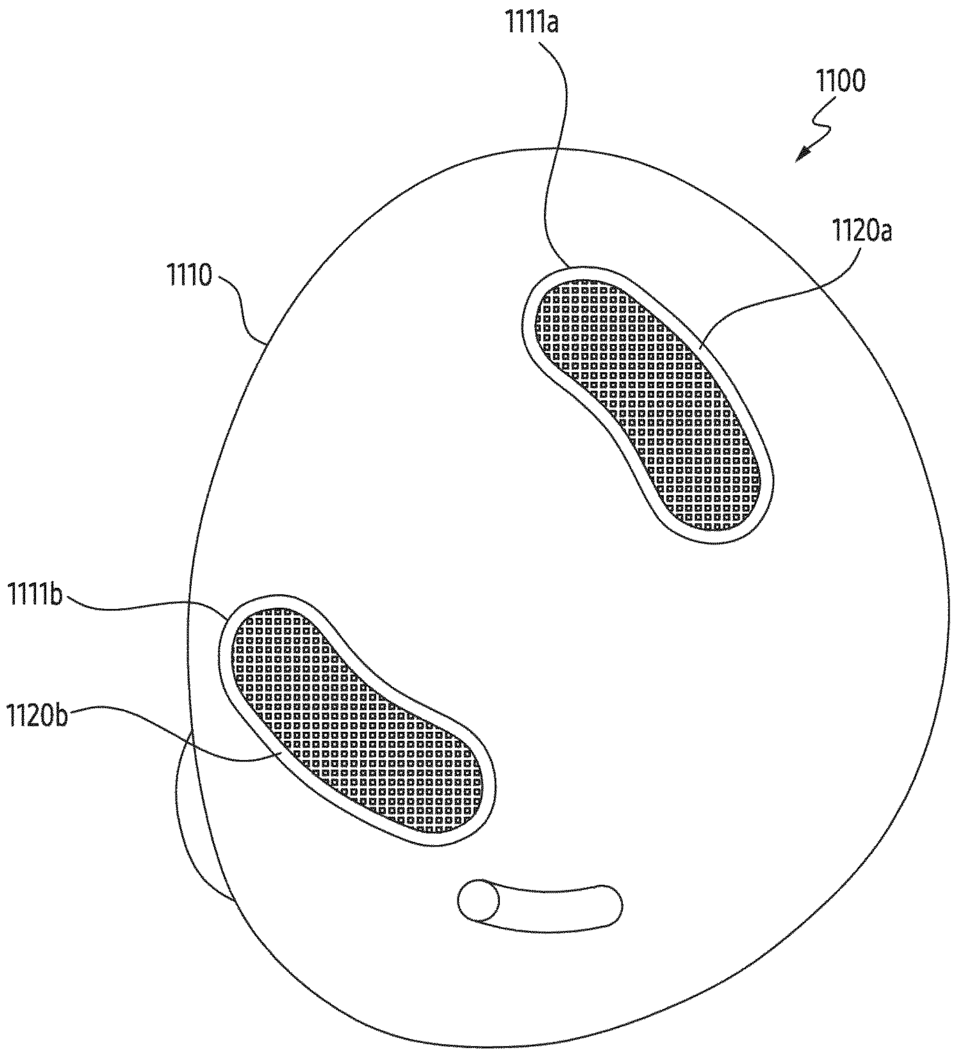
FIGS. 11A and 11B are diagrams illustrating a top plan view illustrating an example in which conductive patterns are connected with grills disposed in a ventilation hole and a microphone hole of a wearable electronic device and a perspective view of the wearable electronic device removing a portion of a housing according to various embodiments.
Figure 11B:
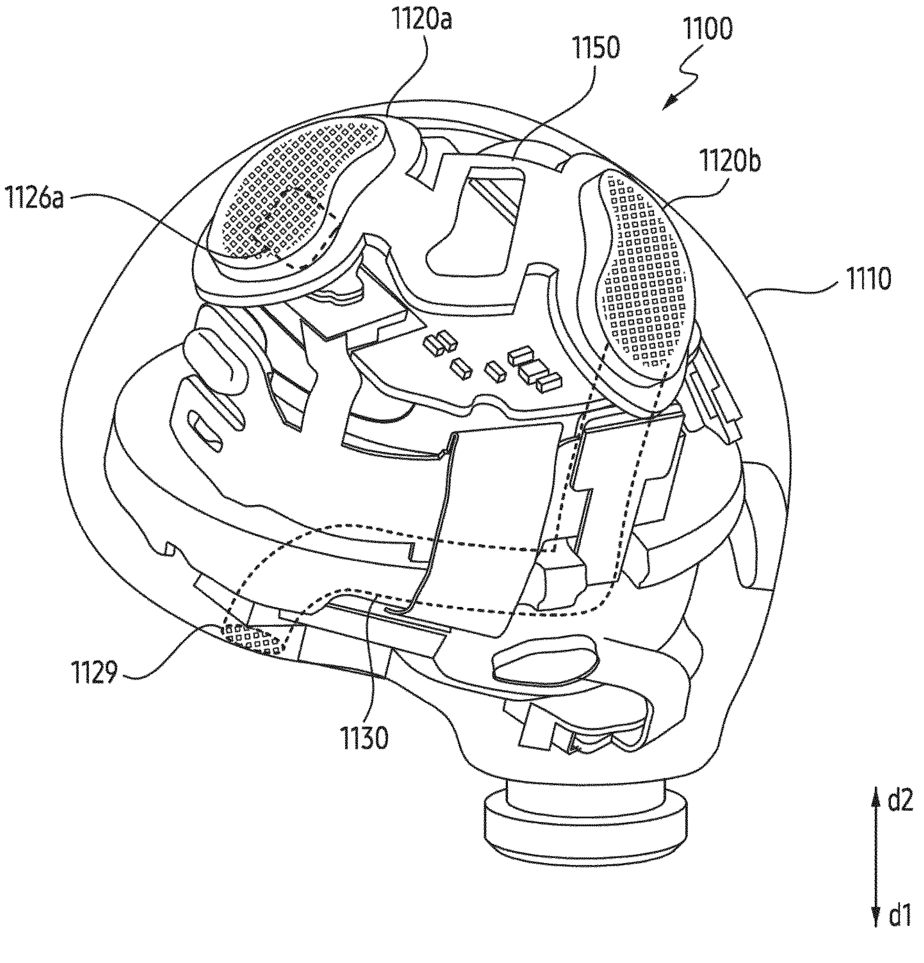

FIGS. 11A and 11B are diagrams illustrating a top plan view illustrating an example in which conductive patterns are connected with grills disposed in a ventilation hole and a microphone hole of a wearable electronic device and a perspective view of removing a portion of a housing according to various embodiments.

Referring to FIGS. 11A and 11B, a wearable device 1100 may further include a housing 1110, a microphone grill 1120*a*, a first ventilation hole grill 1120*b*, a second ventilation hole grill 1129, and a conductive pattern 1150. The housing 1100 may include a first opening 1111*a* and a second opening 1111*b* which may accommodate the microphone grill 1120*a* and the first ventilation hole grill 1120*b*.

According to an embodiment, the microphone grill 1120*a* may be the same as or similar to the grill 220 of FIGS. 2A, 2B, and 2C. The first ventilation hole grill 1120*b* and the second ventilation hole grill 1129 may be the same as or similar to the first grill 920 and the second grill 929 of FIGS. 9A and 9B. Overlapping contents among the contents described in FIGS. 2A, 2B, 2C, 9A, and 9B and the contents of the above-described grills 1120*a*, 1120*b*, and 1129 may not be repeated here.

According to an embodiment, the first ventilation hole grill 1120*b* and the second ventilation hole grill 1129 are disposed at both ends of the ventilation hole 1130 to prevent or block a foreign substance from being introduced into the ventilation hole 1130 from the outside. The ventilation hole may reduce a difference in air pressure between the inside and the outside of the car, which is generated when the wearable device 1100 is worn.

According to an embodiment, the microphone grill 1120*a* may be disposed at an end portion of an acoustic path extending from the microphone 1126*a*. The microphone grill 1120*a* may improve noise inflow and/or prevent or block a foreign substance from being introduced into the acoustic path.

According to an embodiment, the conductive pattern 1150 may be disposed between the microphone grill 1120*a* and the first ventilation hole grill 1120*b*. The conductive pattern 1150 may be integrally formed with the microphone grill 1120*a* and the first ventilation hole grill 1120*b*, and may be attached to an inner surface of the housing 1110. However, is the disclosure not limited thereto, and the conductive pattern 1150, the microphone grill 1120*a*, and the first ventilation hole grill 1120*b* may be formed as a separate member, and electrically connected to each other.

According to an embodiment, the conductive pattern 1150, the microphone grill 1120*a*, and the first ventilation hole grill 1120*b* may be used as an antenna radiator or as a touch sensor. When the conductive pattern 1150, the microphone grill 1120*a*, and the first ventilation hole grill 1120*b* are used as an antenna radiator, grills and conductive pattern may be coupled as illustrated in the wearable device of FIG. 8A. For example, the conductive pattern 1150 may electrically connect the microphone grill 1120*a* and the first ventilation hole grill 1120*b*. The microphone grill 1120*a*, and the first ventilation hole grill 1120*b* may transmit an electromagnetic wave to the outside of the wearable device 1100, with power fed to the conductive pattern 1150, the conductive pattern 1150.

According to an embodiment, the conductive pattern 1150, the microphone grill 1120*a*, and the first ventilation hole grill 1120*b* may be electrically connected or integrally formed with each other, and may be used as a touch sensor detecting access or contact of an external object. The conductive pattern 1150 may have a shape for connecting the microphone grill 1120*a* and the first ventilation hole grill 1120*b*. The conductive pattern 1150 may include a slot or an opening to secure various frequencies. However, the disclosure is not limited thereto. For example, the conductive pattern 1150 may be a conductive plate connecting the microphone grill 1120*a* and the first ventilation hole grill 1120*b*. Based on change in capacitance of the microphone grill 1120*a*, the first ventilation hole grill 1120*b*, and the conductive pattern 1150 by the access or contact of the external object, the wearable device 1100 may detect the access or contact of the external object.

According to an embodiment, as the wearable device 1100 utilizes the conductive members attached to or disposed on the inner surface of the housing 1110 as an antenna radiator or a touch sensor, an inner space efficiency of the wearable device 1100 may be increased. The microphone grill 1120*a*, the first ventilation hole grill 1120*b*, and the conductive pattern 1150 disposed on the inner surface of the housing 1110 may be disposed on the inner surface of the housing 1110, so that the wearable device 1100 may not include a carrier for an antenna pattern, and thus, an inner space capable of being disposing other electronic components may increase. The wearable device 1100 may reduce antenna signal interference and deterioration in radiation performance caused by surrounding conductive portions, by utilizing the conductive members disposed on the inner surface of the housing 1110 as an antenna radiator.

According to an example embodiment, a wearable device (e.g., the wearable device 100 of FIG. 2B) may comprise: a housing (e.g., the housing 210 of FIG. 2B) including a first surface facing a first direction in which a first audio signal is configured to be transmitted to an outside of the wearable device and a second surface including a first opening facing a second direction different from the first direction and connecting the outside and an inner space, a first microphone (e.g., the microphone 226 of FIG. 2B), in the housing, configured to obtain a second audio signal distinct from the first audio signal and conducted through the first opening, a first grill surrounding the first opening and including a conductive portion, a conductive pattern (e.g., the conductive pattern 250 of FIG. 2B) connected to the conductive portion and disposed on a portion of an inner surface of the housing, and at least one processor, comprising processing circuitry, electrically connected to the conductive pattern.

According to an example embodiment, at least one processor, individually and/or collectively, may be configured to communicate with an external electronic device through the conductive pattern and the conductive portion.

According to an example embodiment, the first grill may include a mesh pattern (e.g., the mesh pattern 221 of FIG. 2B) disposed at the first opening, and a support (e.g., the supporter 222 of FIG. 2B) extending along a perimeter of the mesh pattern, the support including the conductive portion having a shape corresponding to the first opening.

According to an example embodiment, the mesh pattern may include a conductive material same as a conductive material of the support.

According to an example embodiment, at least one processor, individually and/or collectively, may be configured to communicate with the external electronic device in a designated frequency band, through the conductive pattern, the support, and the mesh pattern.

According to an example embodiment, the support, forming a closed loop disposed between the first opening and the mesh pattern, may further include a non-conductive portion (e.g., the non-conductive portion 711 of FIG. 7B or the non-conductive portion 712 of FIG. 7C) separating a portion of the closed loop.

According to an example embodiment, the support and the conductive pattern may be configured to function as an antenna radiator.

According to an example embodiment, the first grill may protrude from the inner surface toward the first opening.

According to an example embodiment, at least one processor, individually and/ro collectively, may be configured to obtain data related to access of an external object, based on a change in capacitance between the conductive portion and the conductive pattern according to the access of the external object.

According to an example embodiment, the wearable device may further comprise a printed circuit board on which at least one processor is disposed.

According to an example embodiment, the conductive pattern may include an extension portion (e.g., the extension portion 252 of FIG. 2B) extending to a feeder disposed on the printed circuit board and in contact with the feeder.

According to an example embodiment, the wearable device may further comprise a porous member including a porous material comprising an acoustic path extending from the opening, and the printed circuit board may include a microphone hole (e.g., the microphone hole 421 of FIG. 4) connected to the acoustic path.

According to an example embodiment, the first microphone may obtain the second audio signal from the acoustic path through the microphone hole.

According to an example embodiment, the wearable device may further comprise a speaker, in the housing, configured to generate the first audio signal, and an acoustic duct (e.g., the acoustic duct 231 of FIG. 2B), in the housing, configured to transmit the first audio signal from the speaker to an outside of the wearable device.

According to an example embodiment, the acoustic duct may be formed along the first direction.

According to an example embodiment, at least one processor, individually and/or collectively, may be configured to obtain the second audio signal transmitted along the second direction through the first microphone, and correct the first audio signal, based on the obtained second audio signal.

According to an example embodiment, the conductive pattern may be formed integrally with the conductive portion of the first grill.

According to an example embodiment, the wearable device may further comprise a second microphone (e.g., a second microphone 826*b* of FIG. 8A), distinct from the first microphone (e.g., the first microphone 826*a* of FIG. 8A), facing a third direction.

According to an example embodiment, the housing may further include a second opening, in the second surface, facing the third direction, and configured to transmit a third audio signal distinct from the first audio signal and the second audio signal to the second microphone.

According to an example embodiment, the wearable device may further comprise a second grill surrounding the second opening, the second grill including a conductive portion.

According to an example embodiment, the conductive pattern may connect the conductive portion of the first grill and the conductive portion of the second grill, and at least one processor, individually and/or collectively, may be configured to communicate with the external electronic device through the conductive pattern, the conductive portion of the first grill, and the conductive portion of the second grill.

According to an example embodiment, the housing may include a through hole extending from the first surface to the second surface, and the wearable device may further comprise a third grill surrounding an end of the through hole facing the second surface, the third grill including a conductive portion.

According to an example embodiment, the through hole may be configured to discharge air flowing in from the second surface to the first surface.

According to an example embodiment, the conductive pattern may connect the conductive portion of the first grill and the conductive portion of the third grill.

According to an example embodiment, instructions, when executed by at least one processor of the wearable device, individually and/or collectively, may cause the wearable device to communicate with the external electronic device through the conductive pattern, the conductive portion of the first grill, and the conductive portion of the third grill.

According to an example embodiment, the conductive portion and the conductive pattern may function as an inverted F antenna (IFA), a patch antenna, or a monopole antenna.

According to an example embodiment, a wearable device (e.g., the wearable device 100 of FIG. 2B) may comprise: a housing (e.g., the housing 210 of FIG. 2B) including a first surface including a first opening facing a first direction in which a first audio signal is configured to be transmitted to an outside of the wearable device, a second surface including a second opening facing a second direction different from the first direction and connecting the outside and an inner space of the wearable device, the housing including a through hole connecting the first opening and the second opening, a first grill (e.g., the grill 220 of FIG. 2B) including a mesh pattern disposed at the second opening and a support formed along a perimeter of the mesh pattern, the support having a shape corresponding the second opening, a conductive pattern connected to the first grill and disposed on a portion of an inner surface of the housing, and at least one processor, electrically connected to the conductive pattern.

According to an example embodiment, at least one processor, individually and/or collectively, may be configured to communicate with an external electronic device through the conductive pattern and a portion of the first grill.

According to an example embodiment, the mesh pattern and the support may include a conductive portion.

According to an example embodiment, the conductive pattern, the mesh pattern, and the support may function as an antenna radiator.

According to an example embodiment, at least one processor, individually and/or collectively, may be configured to obtain data related to access of an external object, based on a change in capacitance between the first grill and the conductive pattern according to the access of the external object.

According to an example embodiment, the wearable device may further comprise a microphone, in the housing, configured to obtain a second audio signal distinct from the first audio signal, a second grill, on the second surface, facing a third direction distinct from the second direction and including a conductive portion.

According to an example embodiment, the housing may further include a second opening exposing the second grill to the outside.

According to an example embodiment, the conductive pattern may connect the conductive portion of the first grill and the conductive portion of the second grill.

According to an example embodiment, at least one processor, individually and/or collectively, may be configured to communicate with the external device through the conductive pattern, the conductive portion of the first grill, and the conductive portion of the second grill.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), the element may be coupled with the other element directly (e.g., wiredly), wirelessly, or via a third element.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

No claim element is to be construed under the provisions of 35 U.S.C. § 112, sixth paragraph, unless the element is expressly recited using the phrase "means for" or "means."

What is claimed is:

1. A wearable device comprising:

a housing including a first surface facing a first direction in which a first audio signal is transmitted to an outside of the wearable device and a second surface including a first opening facing a second direction different from the first direction and connecting the outside and an inner space;

a first microphone, in the housing, configured to obtain a second audio signal distinct from the first audio signal and conducted through the first opening;

a first grill surrounding the first opening and including a conductive portion;

a conductive pattern connected to the conductive portion and disposed on a portion of an inner surface of the housing;

at least one processor, comprising processing circuitry, electrically connected to the conductive pattern;

wherein at least one processor, individually and/or collectively, is configured to communicate with an external electronic device through the conductive pattern and the conductive portion.

2. The wearable device of claim 1, wherein the first grill includes:

a mesh pattern disposed at the first opening; and a support extending along a perimeter of the mesh pattern, the support including the conductive portion having a shape corresponding to the first opening.

3. The wearable device of claim 2, wherein the mesh pattern includes a conductive material and the support includes the same conductive material as the mesh pattern, and wherein at least one processor, individually and/or collectively, is configured to communicate with the external electronic device in a designated frequency band, through the conductive pattern, the support, and the mesh pattern.

4. The wearable device of claim 2, wherein the support, forming a closed loop disposed between the first opening and the mesh pattern, further includes a non-conductive portion separating a portion of the closed loop, and wherein the support and the conductive pattern are configured to function as an antenna radiator.

5. The wearable device of claim 1, wherein the first grill protrudes from the inner surface toward the first opening.

6. The wearable device of claim 1, wherein at least one processor, individually and/or collectively, is configured to obtain data related to access of an external object, based on a change in capacitance between the conductive portion and the conductive pattern according to the access of the external object.

7. The wearable device of claim 1, further comprising a printed circuit board on which at least one processor is disposed, wherein the conductive pattern includes an extension portion extending to a feeder disposed on the printed circuit board and in contact with the feeder.

8. The wearable device of claim 7, further comprising a porous member comprising a porous material and forming an acoustic path extending from the opening, wherein the printed circuit board includes a microphone hole connected to the acoustic path, and wherein the first microphone is configured to obtain the second audio signal from the acoustic path through the microphone hole.

9. The wearable device of claim 1, further comprising:

a speaker, in the housing, configured to generate the first audio signal; and an acoustic duct, in the housing, configured to transmit the first audio signal from the speaker to an outside of the wearable device, and wherein the acoustic duct is formed along the first direction.

10. The wearable device of claim 1, wherein at least one processor, individually and/or collectively, is configured to:

obtain the second audio signal transmitted along the second direction through the first microphone; and based on the obtained second audio signal, correct the first audio signal.

11. The wearable device of claim 1, wherein the conductive pattern is formed integrally with the conductive portion of the first grill.

12. The wearable device of claim 1, further comprising a second microphone, distinct from the first microphone, facing a third direction, and wherein the housing further includes a second opening, in the second surface, facing the third direction, and configured to transmit a third audio signal distinct from the first audio signal and the second audio signal to the second microphone.

13. The wearable device of claim 12, further comprising a second grill surrounding the second opening, the second grill including a conductive portion, wherein the conductive pattern connects the conductive portion of the first grill and the conductive portion of the second grill, and wherein at least one processor, individually and/or collectively, is configured to communicate with the external electronic device through the conductive pattern, the conductive portion of the first grill, and the conductive portion of the second grill.

14. The wearable device of claim 1, wherein the housing includes a through hole extending from the first surface to the second surface, wherein the wearable device further comprises a third grill surrounding an end of the through hole facing the second surface, the third grill including a conductive portion, and wherein the through hole is configured to discharge air flowing in from the second surface to the first surface.

15. The wearable device of claim 14, wherein the conductive pattern connects the conductive portion of the first grill and the conductive portion of the third grill, and wherein instructions, when executed by at least one processor of the wearable device, individually and/or collectively, cause the wearable device to communicate with the external electronic device through the conductive pattern, the conductive portion of the first grill, and the conductive portion of the third grill.

16. The wearable device of claim 1, wherein the conductive portion and the conductive pattern is configured to function as an inverted F antenna (IFA), a patch antenna, or a monopole antenna.

17. A wearable device comprising:

a housing including a first surface including a first opening facing a first direction in which a first audio signal is transmitted to an outside of the wearable device and a second surface including a second opening facing a second direction different from the first direction and connecting the outside and an inner space of the wearable device, the housing including a through hole connecting the first opening and the second opening;

a first grill including a mesh pattern disposed at the second opening and a support formed along a perimeter of the mesh pattern, the support having a shape corresponding the second opening;

a conductive pattern connected to the first grill and disposed on a portion of an inner surface of the housing;

at least one processor, comprising processing circuitry, electrically connected to the conductive pattern; and wherein at least one processor, individually and/or collectively, is configured to communicate with an external electronic device through the conductive pattern and a portion of the first grill.

18. The wearable device of claim 17, wherein the mesh pattern and the support include a conductive portion, and wherein the conductive pattern, the mesh pattern, and the support are configured to function as an antenna radiator.

19. The wearable device of claim 17, wherein at least one processor, individually and/or collectively, is configured to obtain data related to access of an external object, based on a change in capacitance between the first grill and the conductive pattern according to the access of the external object.

20. The wearable device of claim 17, further comprising;

a microphone, in the housing, configured to obtain a second audio signal distinct from the first audio signal;

a second grill, on the second surface, facing a third direction distinct from the second direction and including a conductive portion, wherein the housing further includes a second opening exposing the second grill to the outside, wherein the conductive pattern connects the conductive portion of the first grill and the conductive portion of the second grill, and wherein at least one processor, individually and/or collectively, is configured to communicate with the external device through the conductive pattern, the conductive portion of the first grill, and the conductive portion of the second grill.

* * * * *